(12) United States Patent
Sasaki et al.

(10) Patent No.: US 7,025,419 B2
(45) Date of Patent: Apr. 11, 2006

(54) SEAT MECHANISM FOR VEHICLE

(75) Inventors: Kazutaka Sasaki, Kanagawa (JP);
Hidehiko Fujioka, Kanagawa (JP);
Masato Horie, Kanagawa (JP)

(73) Assignee: Shiroki Corporation, Kanagawa-Ken (JP)

(*) Notice: Subject to any disclaimer, the term of this patent is extended or adjusted under 35 U.S.C. 154(b) by 0 days.

(21) Appl. No.: 10/843,355

(22) Filed: May 12, 2004

(65) Prior Publication Data
US 2004/0262969 A1 Dec. 30, 2004

(30) Foreign Application Priority Data
May 12, 2003 (JP) ............... 2003-132692
Jul. 11, 2003 (JP) ............... 2003-273326

(51) Int. Cl.
*B60N 2/48* (2006.01)
*B60N 2/06* (2006.01)
*B60N 2/08* (2006.01)

(52) U.S. Cl. .................. 297/344.11; 397/378.12; 397/378.14

(58) Field of Classification Search ........ 297/378.14, 297/378.12, 344.11
See application file for complete search history.

(56) References Cited

U.S. PATENT DOCUMENTS

| | | | |
|---|---|---|---|
| 3,940,182 A * | 2/1976 | Tamura ............. | 297/378.12 X |
| 4,621,867 A | 11/1986 | Perring et al. | |
| 4,844,542 A * | 7/1989 | Humer ............. | 297/378.12 X |
| 4,881,774 A | 11/1989 | Bradley | |
| 5,020,853 A | 6/1991 | Babbs et al. | |
| 5,100,092 A | 3/1992 | Sovis | |
| 5,407,165 A | 4/1995 | Balocke et al. | |
| 5,544,939 A * | 8/1996 | Baret et al. ............. | 297/378.14 |
| 5,597,206 A * | 1/1997 | Ainsworth et al. ..... | 297/378.12 |
| 5,605,377 A | 2/1997 | Tame | |
| 5,626,392 A * | 5/1997 | Bauer et al. ........ | 297/378.12 X |
| 5,688,026 A | 11/1997 | Reubeuze et al. | |
| 5,707,112 A * | 1/1998 | Zinn ..................... | 297/378.14 |
| 5,855,349 A | 1/1999 | Nini | |
| 5,918,846 A | 7/1999 | Garrido | |
| 5,927,809 A * | 7/1999 | Tame ............... | 297/378.12 X |
| 5,944,383 A | 8/1999 | Mathey et al. | |
| 6,074,009 A * | 6/2000 | Farino .................. | 297/378.14 |
| 6,098,946 A | 8/2000 | Sechet et al. | |
| 6,102,478 A | 8/2000 | Christopher | |
| 6,227,596 B1 | 5/2001 | Foucault et al. | |

(Continued)

FOREIGN PATENT DOCUMENTS

JP  1991-118238  5/1991

(Continued)

*Primary Examiner*—Rodney B. White
(74) *Attorney, Agent, or Firm*—Millen, White, Zelano, Branigan, P.C.

(57) ABSTRACT

A seat mechanism for vehicle includes a lower rail fixed to a vehicle floor; an upper member having an upper rail guided by the lower rail; a seat back pivoted on the upper member and movable between upright and forward-tilted positions; a slide lock mechanism for locking the upper member relative to the lower rail; a slide-position memory mechanism for remembering an adjusted position of the upper rail relative to the lower rail after the seat back has moved to the forward-tilted position; and a forward-tilt holding mechanism for holding the seat back in the forward-tilted position. The forward-tilt holding mechanism includes engaging members which engage when the seat back is in the forward-tilted position, and disengage when the seat back is in the upright position, the forward-tilt holding mechanism providing a resistance force during a returning operation of the seat back to the upright position.

18 Claims, 28 Drawing Sheets

U.S. PATENT DOCUMENTS 6,257,541 B1　7/2001　Timon et al.
6,513,868 B1　2/2003　Tame

FOREIGN PATENT DOCUMENTS

| | | |
|---|---|---|
| JP | 1994-305347 | 11/1994 |
| JP | 1996-253064 | 10/1996 |
| JP | 1999-321393 | 11/1999 |
| JP | 1999-321403 | 11/1999 |
| JP | 1999-334431 | 12/1999 |
| JP | 2001-505511 | 4/2001 |
| JP | 2002-528339 | 9/2002 |

* cited by examiner

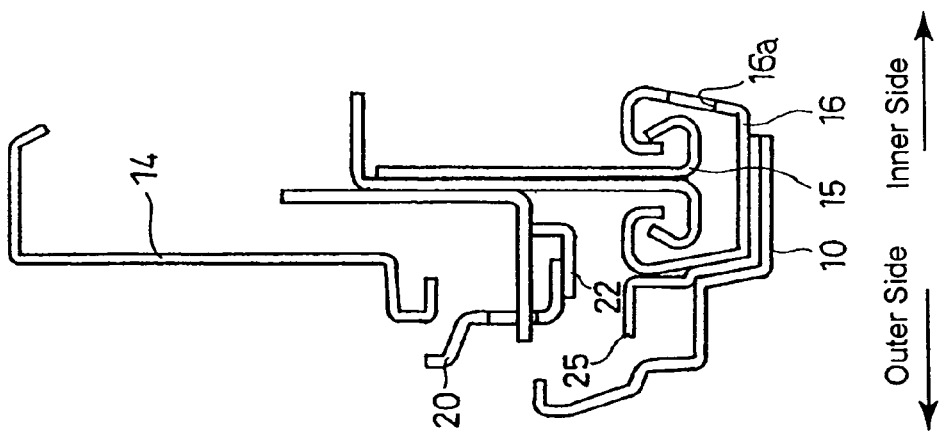
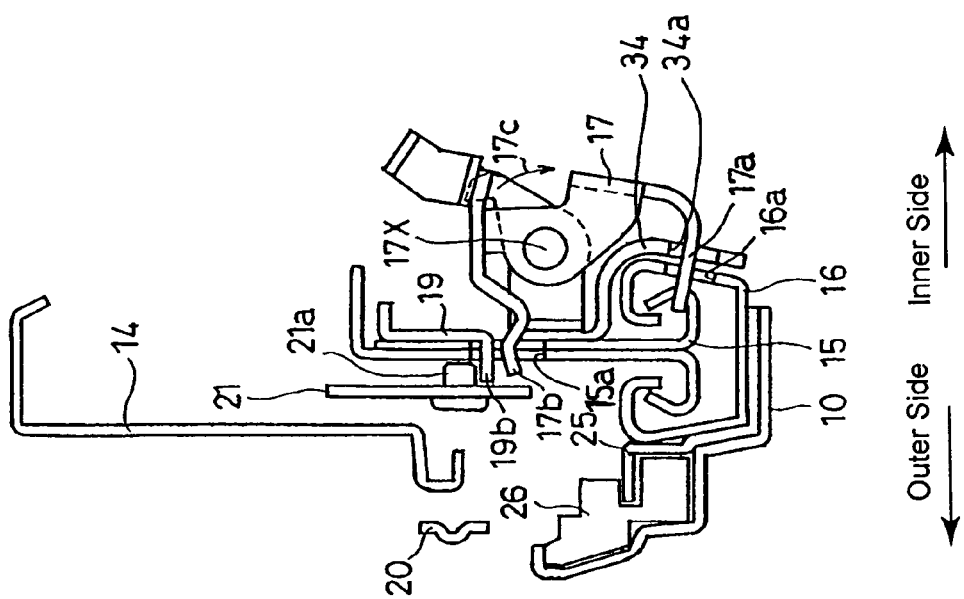
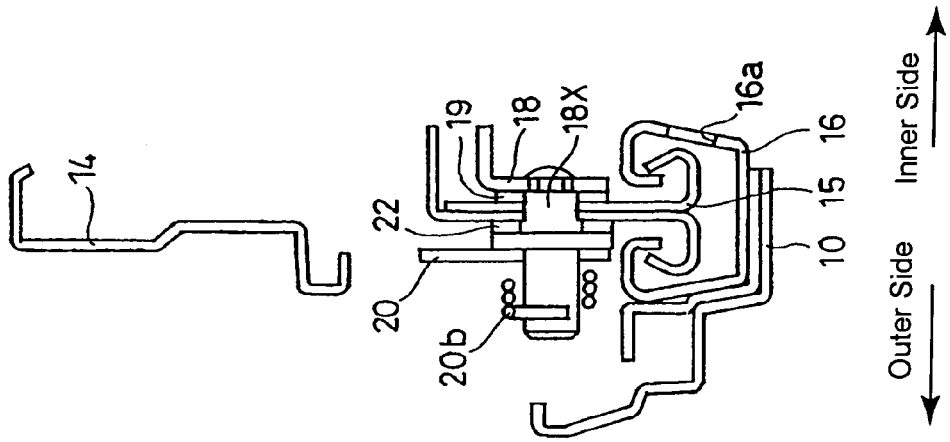

Left (Outer) Side ←          Right (Inner) Side →

This Member Rotates at Reclining Angle Adjusting Operation

This Member Rotates at Walk-in Operation

SEAT MECHANISM FOR VEHICLE

BACKGROUND OF THE INVENTION

1. Field of the Invention

The present invention relates to a seat mechanism for a vehicle.

2. Description of the Related Art

A seat mechanism for a vehicle which includes a slide position memory mechanism is known in the art. Such a seat mechanism has a feature which remembers an adjusted position of a front sliding seat after the front sliding seat (upper rails thereof) has been moved forward relative to lower rails. Such a feature is used when a "walk-in" operation (in which the seat back of the front sliding seat is firstly tilted forward (pivoted forward), and subsequently the front sliding seat is moved fully forward) is performed to allow passengers to enter the rear seat or to allow cargo to be stored behind the-front sliding seat.

A conventional seat mechanism for a vehicle which has such a slide position memory mechanism is disclosed in, e.g., Japanese Unexamined Patent Publication No. 8-253064. In this conventional seat mechanism, the seat back of a front sliding seat is associated with a slide lock of the front sliding seat so that the slide lock is unlocked by pivoting the seat-back forward and the slide lock is locked by returning the seat to the upright position. Due to this structure, when the front sliding seat is returned to the upright position after the completion of the walk-in operation, the slide lock is locked as soon as the seat back is returned to the upright position even before the front sliding seat reaches the position of its previous adjustment, which is remembered by the slide position memory mechanism, which may prevent full use of the slide position memory mechanism. Specifically, since it is generally the case that a front sliding seat is returned to the upright position while holding the seat back of the front sliding seat by hand after the completion of a walk-in operation, the seat back often returns to the upright position unintentionally to thereby lock the slide lock at an unintentional slide position because the seat back tends to be subject to a force in a direction to return the seat back to the upright position. This is a problem in such a type of conventional seat mechanism.

This problem can be overcome with a prior-art mechanism (disclosed in, e.g., Japanese Unexamined Patent Publication No.11-321393) which prevents the slide lock of the front sliding seat from being locked even if the seat back is returned to the upright position unless the front sliding seat is moved back to the position of its previous adjustment which is remembered by the slide position memory mechanism. However, if the seat mechanism is constructed so that the slide lock cannot be locked at all times unless the front sliding seat is moved back to the position of its previous adjustment which is remembered by the slide position memory mechanism, safety of the seat mechanism cannot be ensured when the front sliding seat cannot be moved back to the position of its previous adjustment which is remembered by the slide position memory mechanism due to a bulky luggage or the like in the rear seat. Namely, if the seat back is returned to the upright position at a position in front of the position of its previous adjustment which is remembered by the slide position memory mechanism, it is then possible for the front sliding seat to be sat in even though the slide lock thereof is not locked. In this unlocked state, if a passenger or a driver sits in the front sliding seat, there is a high possibility of the front sliding seat accidentally sliding along the lower rails, which may pose a danger to the passenger or the driver.

In the above noted conventional seat mechanism disclosed in Japanese Unexamined Patent Publication No.8-253064, the seat back of a front sliding seat is inter-geared with a slide position memory mechanism. Specifically, in this conventional seat mechanism, a shoe that is a component of the slide position memory mechanism is in a memory release position (relative to the lower rails) at which the shoe can move relative to the lower rails so that the slide position memory mechanism does not operate. On the other hand, pivoting the seat back forward causes the shoe to move to a memory position (relative to the lower rails) at which the shoe is prevented from moving relative to the lower rails. This prevents the front sliding seat from moving rearward beyond the shoe, thus bringing the slide position memory mechanism into operation. When the seat back returns to the upright position, the tension in the wire cable, which connects the seat back with a lock member pivoted to an upper rail, is loosened to thereby cause the lock member to rotate in a predetermined rotational direction by the biasing force of a spring which continuously biases the lock member in the predetermined rotational direction. This rotation of the lock member causes a catch member, by which a locking state between the shoe and the lower rail is held, to rotate by a pin-shaped second finger which projects from the lock member, thus releasing a locked state between the shoe and the lower rail. Concurrently with this lock releasing operation, a pin-shaped first finger which is fixed to the lock member is engaged with a rear end surface of the shoe, so that moving the front sliding seat (upper rails) forward causes a seat moving force thereof to be transferred to the shoe via the first finger to move the shoe forward together with the front sliding seat.

It can be understood from the above descriptions that two different operations: the lock releasing operation between the lower rail and the shoe at an operation pivoting the seat back to the upright position, and an operation transferring a moving force of the sliding seat to the shoe are performed with two pins fixed to the lock member, i.e., with the aforementioned first and second fingers, respectively. Due to this structure, the lock member is required to be made with a high working accuracy. If the first and second pins deviate from their original positions, the aforementioned two operations (the lock releasing operation and the seat-moving-force transfer operation) cannot be performed smoothly.

SUMMARY OF THE INVENTION

The present invention has been devised in view of the problem noted above, and provides a seat mechanism for vehicle which makes it possible to use the slide position memory mechanism effectively while allowing the slide lock of a sliding seat to operate with reliability regardless of the position of the sliding seat at the sitting of a passenger or a driver. The present invention further provides a seat mechanism for vehicle which incorporates a simple slide position memory mechanism which can operate smoothly with reliability.

According to an aspect of the present invention, a seat mechanism for vehicle is provided, including a lower rail fixed to a vehicle floor; an upper member having an upper rail which is guided by the lower rail to be freely slidable thereon; a seat back which is pivoted on the upper member, the seat back being movable between an upright position and a forward-tilted position; a slide lock mechanism for locking the upper member relative to the lower rail when the seat back is in the upright position, and for unlocking the upper rail relative to the lower rail when the seat back is in the forward-tilted position; a slide-position memory mechanism for remembering an adjusted position of the upper rail relative to the lower rail after the seat back has been pivoted forward to the forward-tilted position so that the upper rail is prevented from moving rearward beyond the adjusted position; and a forward-tilt holding mechanism for holding the seat back in the forward-tilted position. The forward-tilt holding mechanism includes at least two engaging members which are engaged with each other when the seat back is in the forward-tilted position, and which are disengaged from each other when the seat back is in the upright position, the forward-tilt holding mechanism providing a resistance force in the engagement of one of the two engaging members with the other of the two engaging members during a returning operation of the seat back to the upright position from the forward-tilted position.

The forward-tilt holding mechanism can include a ratchet which is supported by the seat back to be rotatable about a rotational axis (Hx) of the seat back; at least one recess formed on an outer edge of the ratchet; a pawl which is supported by the seat back to be movable relative to the seat back between an engaging position, in which the pawl is engaged with the recess, and a disengaging position, in which the pawl is disengaged from the recess, when the seat back is tilted forward; and a biasing member for biasing the pawl in a direction toward the engaging position.

It is desirable for a plurality of recesses to be formed on the outer edge of the ratchet, and for the pawl to be selectively engaged in one of the plurality of recesses and the other of the plurality of recesses when the seat back is in the forward-tilted position and the upright position, respectively.

The engaging members of the forward-tilt holding mechanism can include a stop member mounted to the seat back, and a movable engaging member mounted to the upper member. The movable engaging member is engaged with the fixed engaging member when the seat back is tilted forward. The movable engaging member is movable in a direction to be disengaged from the fixed engaging member.

It is desirable for the movable engaging member, which is mounted to the upper rail, to include a holding spring which is resiliently deformable between a first state, in which the holding spring holds the fixed engaging member, and a second state, in which the holding spring releases the fixed engaging member.

It is desirable for the movable engaging member, which is mounted to the seat cushion, to include a rotatable member which is rotatable between an engaging position in which the rotatable member is engaged with the fixed engaging member and a disengaging position in which the rotatable member is disengaged from the fixed engaging member. The seat mechanism can further include a biasing member for biasing the rotatable member toward the engaging position thereof.

The seat mechanism can include a disengaging device for forcing the rotatable member to rotate toward the disengaging position when the upper rail is positioned in the adjusted position.

The seat mechanism can further include a forward-tilt biasing device for biasing the seat back toward the forward-tilted position, and a holding device for holding the seat back in the upright position against a biasing force of the forward-tilt biasing device. A magnitude of the resistance force of the forward-tilt holding mechanism is greater than a magnitude of a resistance force in the forward-tilt biasing device.

In another embodiment, a seat mechanism for vehicle is provided, including a lower rail fixed to a vehicle floor; an upper member having an upper rail which is guided by the lower rail to be freely slidable thereon; a seat back which is pivoted on the upper member, the seat back being movable between an upright position and a forward-tilted position; and a slide-position memory mechanism for remembering an adjusted position of the upper rail relative to the lower rail after the seat back has been pivoted forward to the forward-tilted position so that the upper rail is prevented from moving rearward beyond the adjusted position. The slide-position memory mechanism includes a memory lock member movable between a memory position in which the memory lock member is immovable relative to the lower rail and a memory release position in which the memory lock member is movable along the lower rail, the memory lock member including one of an engaging projection and an engaging recess which are engageable with each other; a biasing member for biasing the memory lock member in a direction to the memory position; a catch lever which is mounted to the upper rail and includes the other of the engaging projection and the engaging recess, the catch lever being movable between an unlocked position, in which the catch lever moves the memory lock member to the memory release position against the biasing member with the engaging projection and the engaging recess remaining engaged with each other, and a locked position, in which the catch lever allows the memory lock member to return to the memory position; and an operating device for moving the catch lever between the locked position and the unlocked position.

It is desirable for a plurality of memory lock holes to be formed on one of the lower rail and a fixed member which is fixed to the lower rail to be aligned in a longitudinal direction of the one of the lower rail and the fixed member, wherein at least one memory lock projection, which is selectively engageable with the plurality of memory lock holes, is formed on the other of the lower rail and the fixed member. The memory lock member is held in the memory position by engagement of the memory lock projection with at least one of the plurality of memory lock holes.

It is desirable for a plurality of memory lock projections to be formed on one of the lower rail and a fixed member fixed to the lower rail to be aligned in a longitudinal direction of the one of the lower rail and the fixed member, wherein at least one memory lock hole which is selectively engageable with the plurality of memory lock projections is formed on the other of the lower rail and the fixed member. The memory lock member is held in the memory position by engagement of the memory lock hole with at least one of the plurality of memory lock projections.

It is desirable for the slide-position memory mechanism to include a slide stop which is immovable relative to the upper rail when the memory lock member is in the memory position. The upper rail can include a stop projection which comes into contact with the slide stop to prevent the sliding seat from moving rearward beyond a point of the contact between the stop projection and the slide stop when the memory lock member is in the memory position.

The seat mechanism for vehicle can include a slide lock mechanism which is changeable between a locking state, in which the slide lock mechanism locks the upper rail relative to the lower rail, and an unlocking state, in which the slide lock mechanism unlocks the upper rail relative to the lower rail. The operating device can include an operating handle which is manually operated to change the slide lock mechanism between the locking state and the unlocking state. The operating handle moves the catch lever to the locked position when the slide lock mechanism is in the locking state, and the operating handle moves the catch lever to the unlocked position when the slide lock mechanism is in the unlocking state.

It is desirable for the operating device to include a pull wire for transmitting motion of the seat back to the catch lever, wherein the pull wire moves the catch lever to the unlocked position when the seat back is in the upright position, and the pull wire moves the catch lever to the locked position when seat back tilts forward to the forward-tilted position.

It is desirable for the catch lever to be pivoted on the upper member to be rotatable forward and reverse in accordance with an operation of the pull wire, and is continuously biased to rotate toward the unlocked position, wherein the slide-position memory mechanism includes a slide member which moves together with the memory lock member in a longitudinal direction of the lower rail. The slide member includes an accommodation recess for accommodating the memory lock member, and a leading surface for leading one of the engaging recess and the engaging projection of the catch lever to the accommodation recess while making the catch lever rotate toward the locked position when the catch lever which is positioned in front of the slide member moves rearward while sliding on the leading surface.

The present disclosure relates to subject matter contained in Japanese Patent Applications Nos.2003-132692 (filed on May 12, 2003) and 2003-273326 (filed on Jul. 11, 2003) which are expressly incorporated herein by reference in their entireties.

BRIEF DESCRIPTION OF THE DRAWINGS

The present invention will be described below in detail with reference to the accompanying drawings in which:

FIG. 10 is a cross sectional view taken along A—A line shown in FIG. 5;

FIG. 11 is a cross sectional view taken along B—B line shown in FIG. 5;

FIG. 12 is a cross sectional view taken along C—C line shown in FIG. 5, showing a locked state of a slide lock mechanism;

DESCRIPTION OF THE PREFERRED EMBODIMENTS

Figure 1:
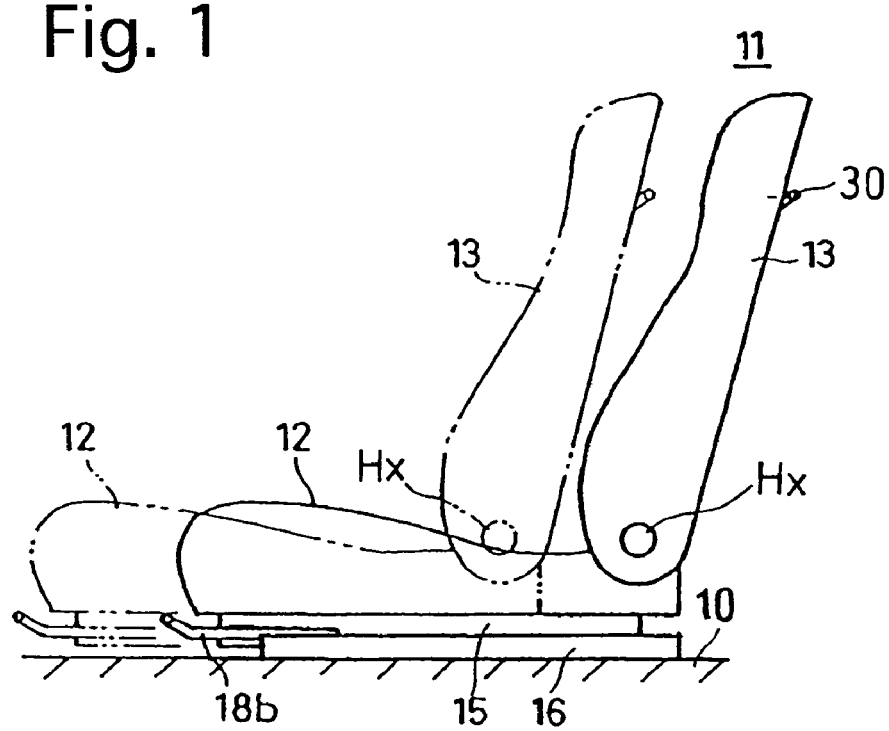
FIG. 1 is a side elevational view of a first embodiment of a seat mechanism for vehicle according to a first aspect of the present invention, showing a normal seating state and a forwardly-moved state of a front sliding seat.
Figure 2:
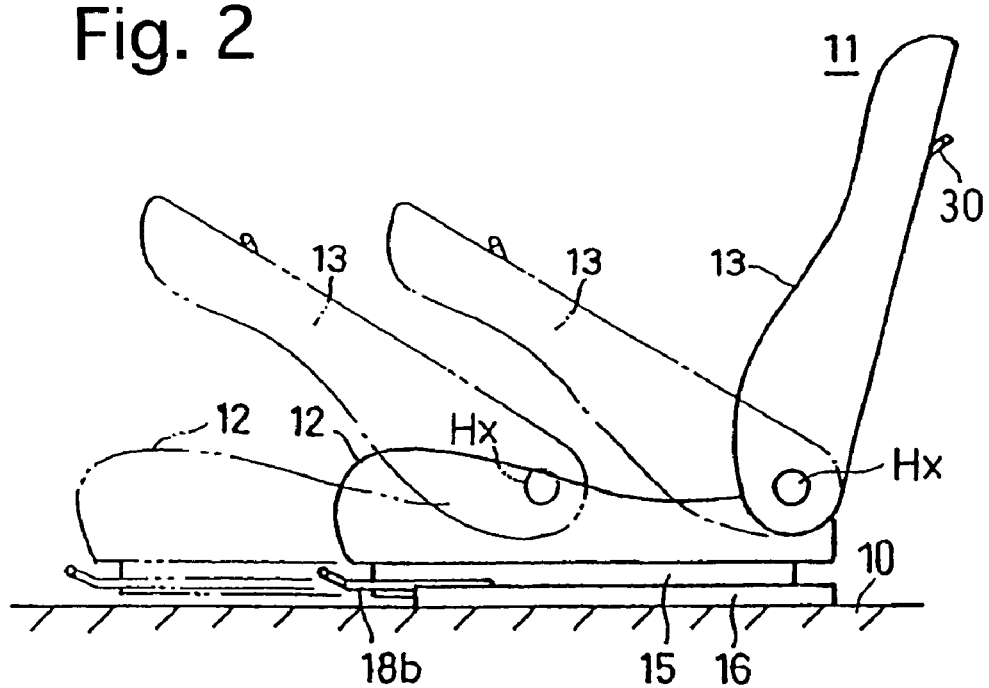
FIG. 2 is a side elevational view of the seat mechanism shown in FIG. 1, showing a walk-in operation of the front sliding seat.

A first embodiment of a seat mechanism for vehicle according to an aspect (first aspect) of the present invention will be hereinafter discussed with reference to FIGS. 1 through 22. FIGS. 1 and 2 show a front sliding seat (a front passenger seat or a driver's seat) 11 of a vehicle. Although the front sliding seat 11 is a front left sliding seat in this particular embodiment, the present invention obviously can also be applied to a front right sliding seat in a similar fashion.

The sliding seat 11 is provided with a seat cushion 12 for supporting the buttocks of a driver or a passenger, and a seat back 13 for supporting the back of a driver or a passenger. The seat cushion 12 is provided therein on right and left sides of the seat cushion 12 with a pair of seat cushion frames 14 (only one of them appears in FIG. 4), respectively. Likewise, the seat back 13 is provided therein on right and left sides of the seat back 13 with a pair of seat back frames (not shown).

The seat back 13 (seat back frames) is pivoted on the pair of seat cushion frames 14 to be rotatable between an upright position shown in FIG. 1 and a forward-tilted position shown in FIG. 2.

The sliding seat 11 is provided on right and left sides thereof with a pair of upper rails (only one of them appears in FIGS. 1 and 2) 15 which support the pair of seat cushion frames 14, respectively. Although the pair of seat cushion frames 14 are fixed to the pair of upper rails 15 in the present embodiment of the sliding seat, the pair of seat cushion frames 14 can be supported by the pair of upper rails 15 via a seat lifter mechanism (not shown) for adjusting the height of the seating surface of the seat cushion 14. The sliding seat 11 is provided on right and left sides thereof with a pair of lower rails (only one of them appears in FIGS. 1 and 2) 16 which respectively support the pair of upper rails 15 so that the pair of upper rails 15 can freely slide on the pair of lower rails 16 in a longitudinal direction thereof (horizontal direction as viewed in FIGS. 1 and 2). This structure makes it possible to adjust the position of the sliding seat 11 in a forward/rearward direction thereof by sliding the pair of upper rails 15 on the pair of lower rails 16. The pair of upper rails 15 are biased forward by a biasing spring (extension spring) 15F that is indicated by a schematic representation in FIG. 4, in which the biasing direction of the biasing spring 15F is indicated by the appended arrow.

Figure 3:
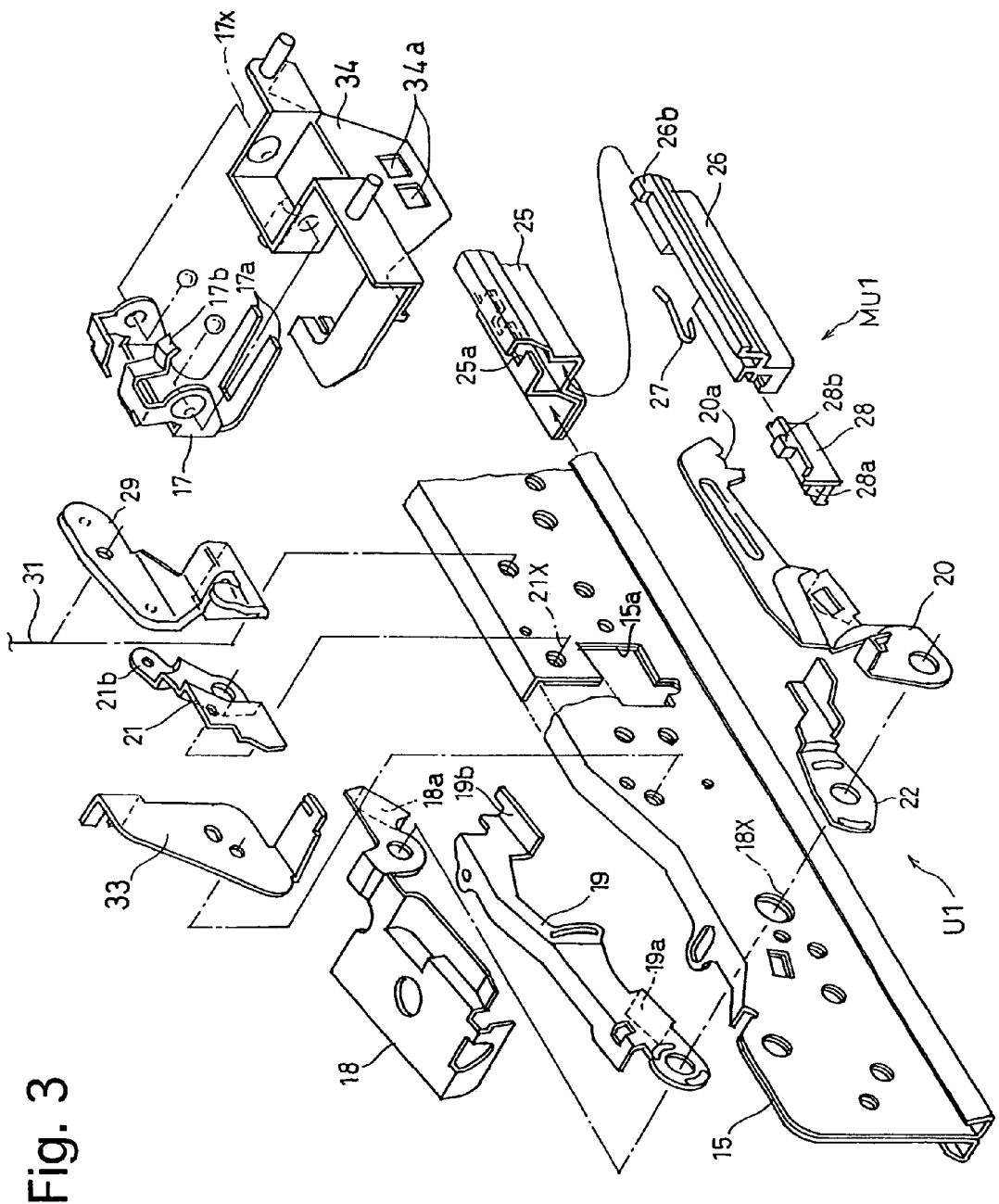
FIG. 3 is an exploded perspective view of a seat slide mechanism (elements of a slide position memory mechanism and elements of a slide lock mechanism) incorporated in the first embodiment of the seat mechanism.
Figure 4:
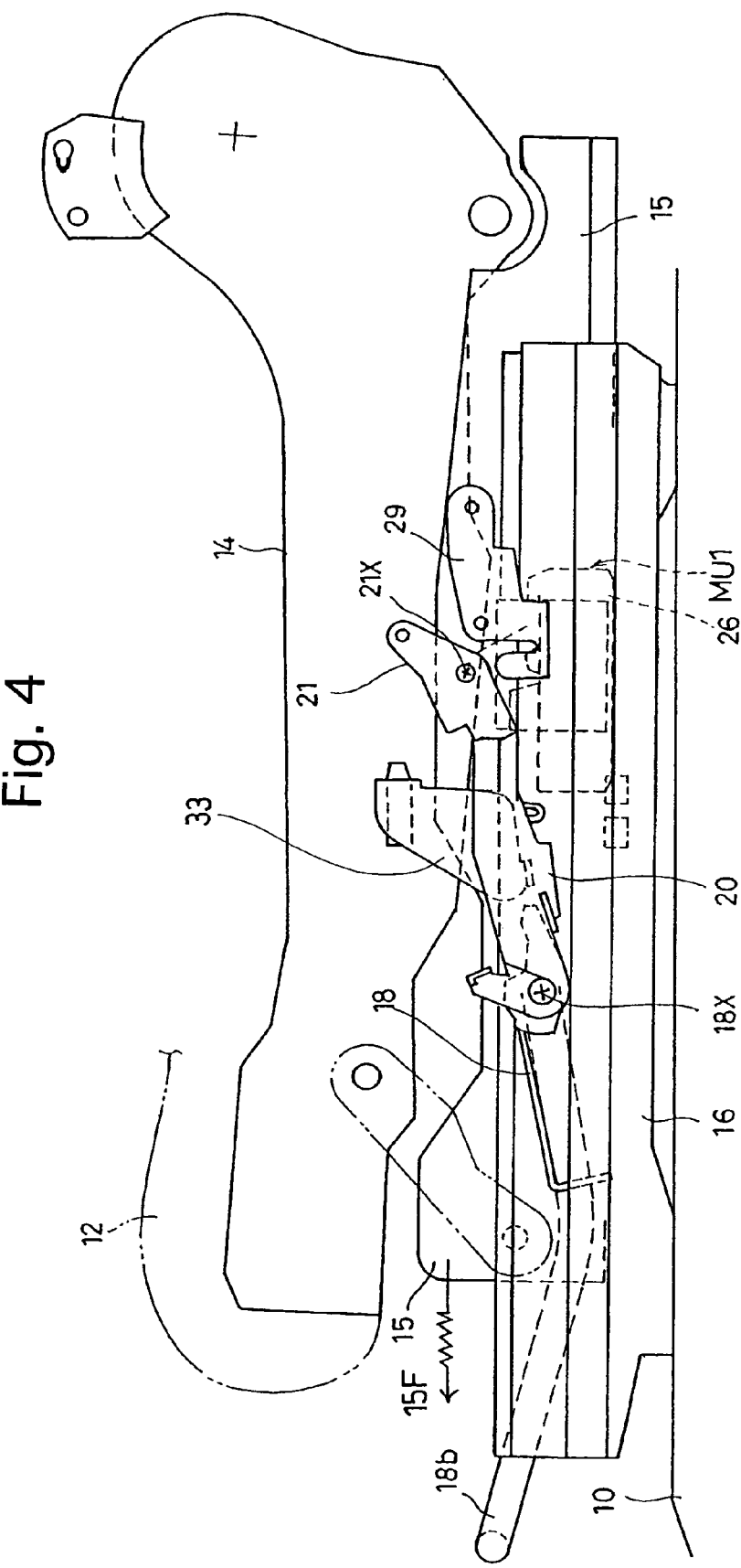
FIG. 4 is a side elevational view of the seat slide mechanism shown in FIG. 3.

Each lower rail 16 is provided, along a longitudinal direction thereof at predetermined intervals, with a plurality of slide lock holes (elements of a slide lock mechanism) 16a (only one of them appears in FIGS. 10 through 15). A slide lock member 17 for locking the pair of upper rails 15 relative to the pair of lower rails 16 is mounted to each upper rail 15. More specifically, one slide lock member 17 is mounted to each upper rail 15 via an associated support member 34 (see FIG. 3) which is fixed to the upper rail 15, and is pivoted on the support member 34 about a rotational axis 17X. As shown in FIG. 3, the slide lock member 17 is provided with a bifurcated nail portion 17a (an element of the slide lock mechanism) selectively engageable with the slide lock holes 16a through a pair of guide square holes 34a (see FIG. 3) formed on the associated support member 34, and is further provided with a pressed arm portion 17b which is positioned above the bifurcated nail portion 17a. The rotational axis 17X is parallel to the longitudinal direction of the pair of lower rails 16. The slide lock member 17 is rotatable about the rotational axis 17X between a locked position (see FIG. 12) in which the bifurcated nail portion 17a is engaged with adjacent two of the slide lock holes 16a and an unlocked position (see FIG. 13) in which the bifurcated nail portion 17a is disengaged from the slide lock holes 16a. When each slide lock member 17 is in the locked position as shown in FIG. 12, the pair of upper rails 15 are prevented from sliding along the pair of lower rails 16. Each slide lock member 17 is biased to rotate in a direction toward the locked position by an associated biasing spring (extension spring) 17c that is schematically indicated by an arrow in FIGS. 12 and 13. A square hole 15a is formed on each upper rail 15, while the pressed arm portion 17b of each slide lock member 17 is inserted into the square hole 15a of the associated upper rail 15 from an inner side surface thereof to project from an outer side surface of the associated upper rail 15 (see FIG. 12).

The sliding seat 11 is provided on each upper rail 15 with a loop-handle bracket 18 which is pivoted about a rotational axis 18X fixed to the upper rail 15. The rotational axis 18X extends in a direction orthogonal to the rotational axis 17X of each slide lock member 17 (namely, in a right/left direction of the sliding seat 11). The loop-handle bracket 18 is provided at one end thereof with a pressing portion 18a. The sliding seat 11 is provided on each upper rail 15 with a lock open bracket 19 which is pivoted about the rotation axis 18X together with the loop-handle bracket 18. The pressing portion 18a is in contact with a pressed portion 19a formed on the lock open bracket 19. The open bracket 19 is pivoted about the rotational axis 18X so that the open bracket 19 and the loop-handle bracket 18 can rotate about the same rotational axis 18X relative to each other (see FIG. 10). The open bracket 19 is provided on a free end thereof, which is positioned off the pivoted end of the open bracket 19 that is pivoted by the rotational axis 18X, with a pressing portion 19b. The pressing portion 19b of each lock open bracket 19 is inserted into the square hole 15a of the associated upper rail 15 to be positioned above the pressed arm portion 17b of the associated slide lock member 17 (see FIGS. 12 and 13).

Figure 5:
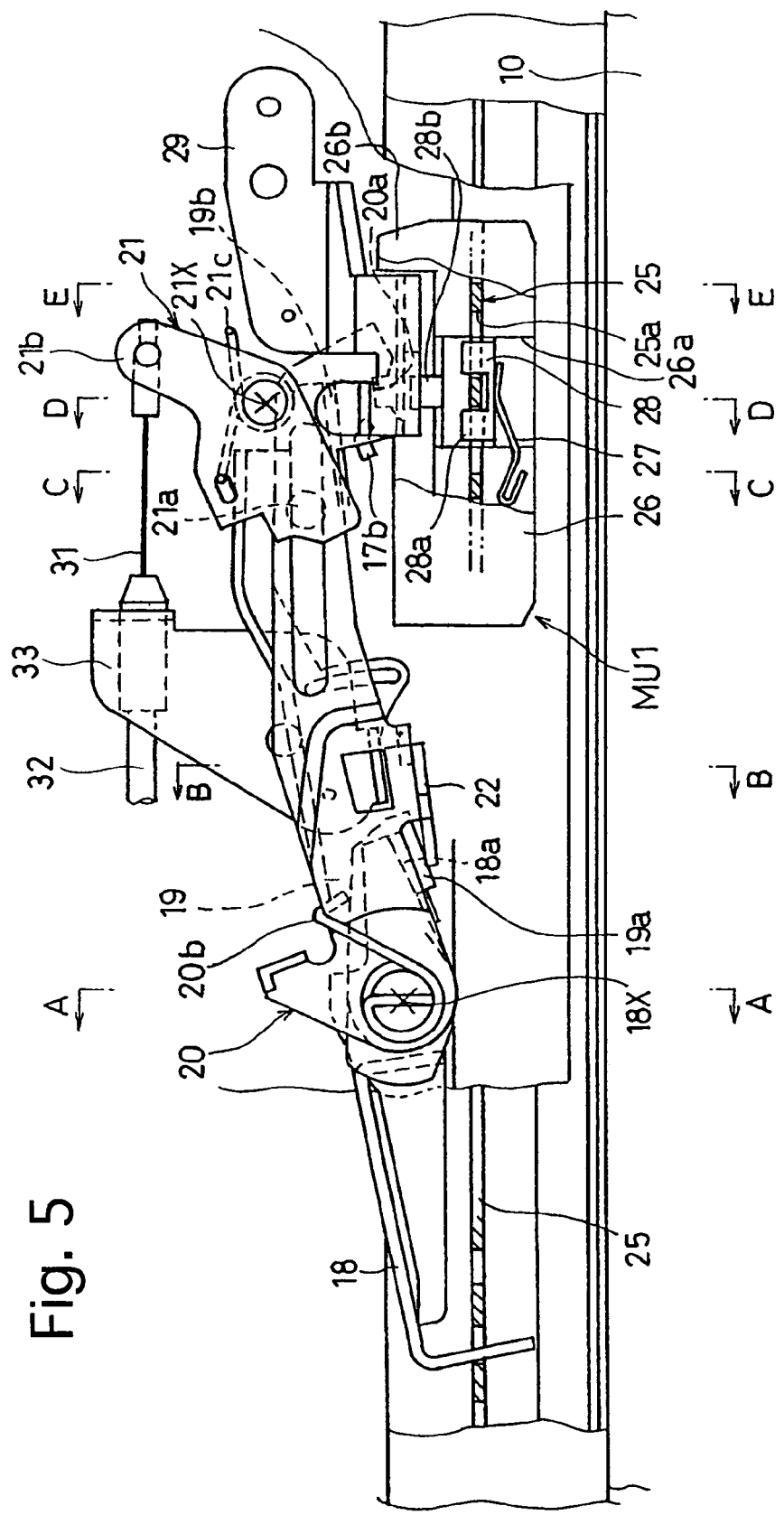
FIG. 5 is a side elevational view of the seat slide mechanism in a normal seating state of the front sliding seat, showing the lock state of a slide lock mechanism.
Figure 6:
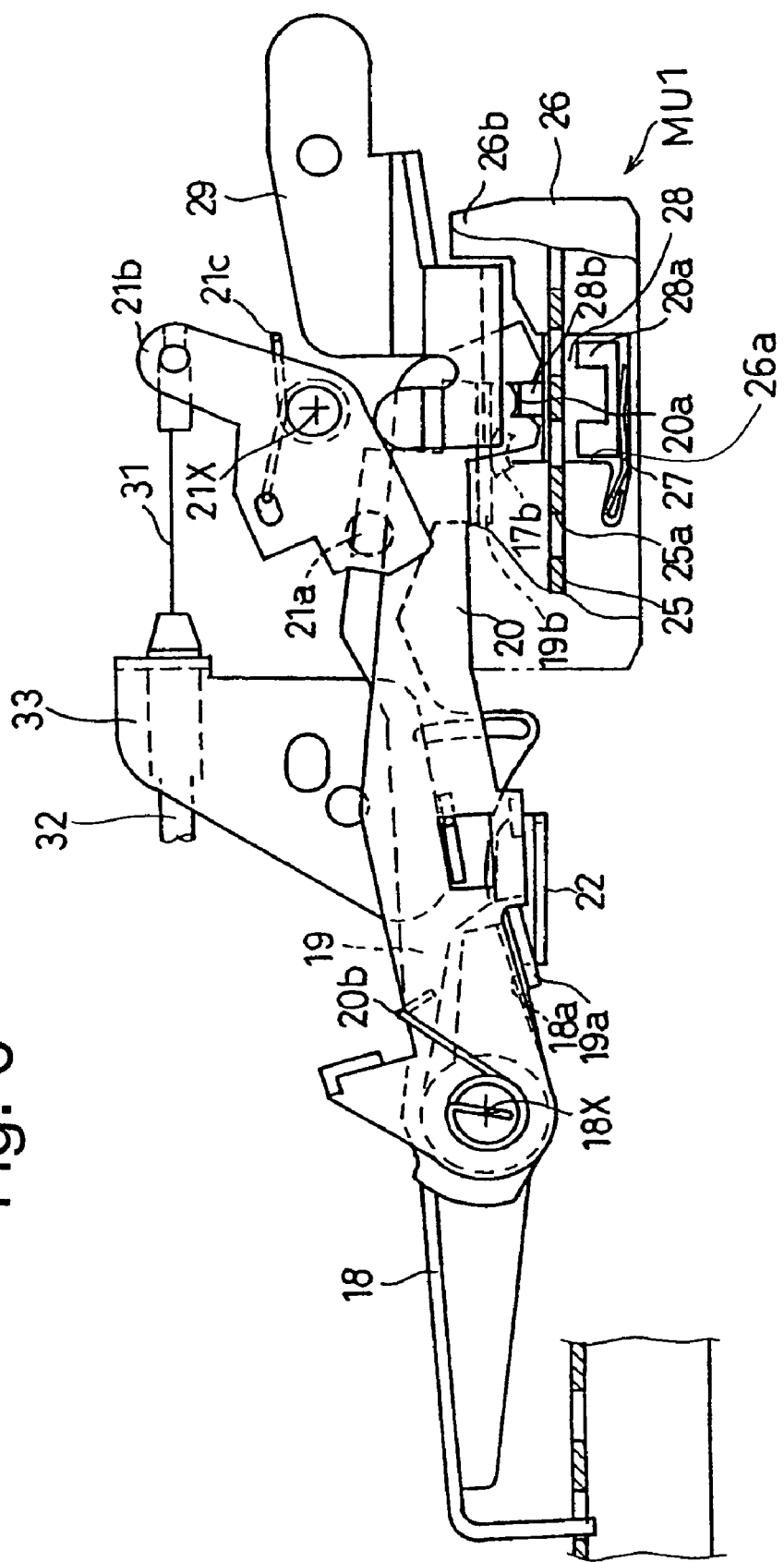
FIG. 6 is a side elevational view of the seat slide mechanism in a normal sliding state of the front sliding seat, showing a lock release state of the slide lock mechanism.
Figure 7:
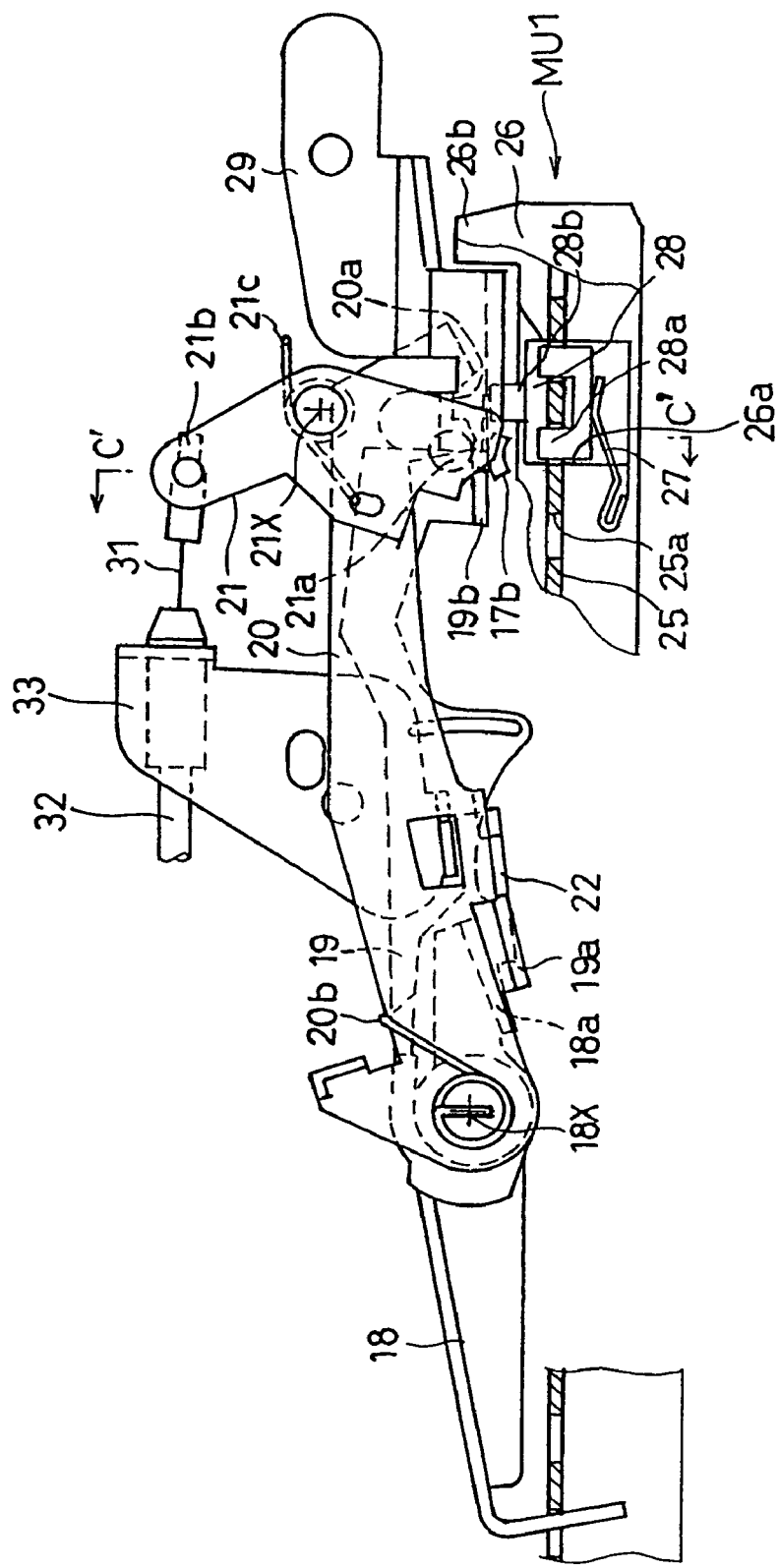
FIG. 7 is a side elevational view of the seat slide mechanism in a state immediately after the walk-in operation is performed.

Rotating each loop-handle bracket 18 clockwise as viewed in FIG. 5 by manually operating a loop handle (operating device/operating handle) 18b causes the pressing portion 18a of each loop-handle bracket 18 to press the pressed portion 19a of the associated lock open bracket 19 to rotate each lock open bracket 19 in the same rotational direction. This rotation of each lock open bracket 19 causes the pressing portion 19b thereof to press the pressed arm portion 17b of the associated slide lock member 17, thus causing each slide lock member 17 to rotate in an unlocking direction to thereby disengage the bifurcated nail portion 17a from the slide lock holes 16a on the associated lower rail 16 against the spring force of the biasing spring 17c.

The sliding seat 11 has a slide position memory mechanism (first embodiment of the slide position memory mechanism). This position memory mechanism has a feature that "remembers" the position of the previous adjustment to the sliding seat 11 (the pair of upper rails 15) after the sliding seat 11 (the pair of upper rails 15) has been moved forward relative to the pair of lower rails 16 when a "walk-in" operation (in which firstly the seat back 13 is pivoted forward and subsequently the sliding seat 11 is moved forward) is performed. In the following descriptions concerning the slide position memory mechanism, the terms "clockwise" and "counterclockwise" refer to a clockwise direction and a counterclockwise direction with respect to the side elevational views in FIGS. 4 through 9.

The sliding seat 11 is provided on the left upper rail 15 with a catch lever 20. The catch lever 20 is pivoted on an outer side surface of the left upper rail 15, which is positioned on the opposite side of the left upper rail 15 from the inner side surface thereof to which the loop-handle bracket 18 and the lock open bracket 19 are mounted. The catch lever 20 is pivoted at one end thereof about the rotational axis 18X, about which the loop-handle bracket 18 and the lock open bracket 19 are also pivoted (see FIG. 10). A free end of the catch lever 20 is bifurcated to have an engaging recess 20a. The catch lever 20 is coupled to a stop lever 22 via a torsion spring 20b.

The stop lever 22 is supported on the left upper rail 15 to rotate together with the loop-handle bracket 18 on the rotational axis 18X. A lock open lever 21 is pivoted about a rotational pin 21X to the outer side surface of the left upper rail 15 to which the catch lever 20 and the stop lever 22 are mounted. The lock open lever 21 is provided with a pressing pin 21a (see FIGS. 12 and 13) and a wire cable engaging arm 21b, and is biased in a clockwise direction by a torsion spring 21c. The pressing pin 21a can come into contact with the pressing portion 19b of the lock open bracket 19, which is inserted into the square hole 15a of the associated upper rail 15 to be positioned above the pressed arm portion 17b of the associated slide lock member 17.

The sliding seat 11 is provided with a memory rack 25 which is fixed to the left lower rail 16. The memory rack 25 is an elongated member which is elongated in a direction parallel to the left lower rail 16, and is provided with a plurality of memory lock holes 25a. A slide member 26 is supported by the memory rack 25 to be slidable thereon in a lengthwise direction of the memory rack 25, while a memory lock lever (memory lock member) 28 is positioned in the slide member 26. The slide member 26 is provided with an accommodation recess 26a which extends vertically, and the memory lock lever 28 is supported by the slide member 26 in the accommodation recess 26a (see FIGS. 3 and 5) to be allowed to move in the vertical direction of the sliding seat 11 (a direction orthogonal to the sliding direction of the slide member 26 that faces the memory rack 25) while being prevented from moving in the forward/rearward direction of the sliding seat 11 (the sliding direction of the slide member 26/the longitudinal direction of the slide member 26). Due to this structure, the memory lock lever 28 is movable between a memory position (the position shown in FIGS. 5, 7 through 9, and 14) in which two memory lock projections 28a formed on the memory lock lever 28 are engaged in adjacent two of the plurality of memory lock holes 25a and a memory release position (the position shown in FIG. 6) in which the two memory lock projections 28a of the memory lock lever 28 are disengaged from the plurality of memory lock holes 25a. The memory lock lever 28 is provided with an engaging projection 28b which is positioned on a rotational moving path of the engaging recess 20a of the catch lever 20, and is continuously biased toward the memory position by a biasing spring 27.

The loop-handle bracket 18 (which is mounted to the left rail 15), the catch lever 20, the stop lever 22, the memory rack 25, the slide member 26, the biasing spring 27 and the memory lock lever 28 constitute a slide memory mechanism (slide-position memory mechanism) U1 of the sliding seat 11.

In addition, the slide member 26, the biasing spring 27 and the memory lock lever 28 constitute a memory unit MU1.

A slide stop 29 is fixed to the left upper rail 15. The slide stop 29 is engageable with a stop projection (slide stop projection) 26b which projects from an upper surface of the slide member 26 (see FIG. 15).

The structure supporting the seat back 13 will be hereinafter discussed with reference to FIGS. 16 through 22. The sliding seat 11 has an angle memory mechanism. This angle memory mechanism is a feature that "remembers" the angular position of the previous adjustment to the seat back 13 after the seat back 13 has been pivoted forward. In the following descriptions concerning the seat back supporting structure, the terms "clockwise" and "counterclockwise" refer to a clockwise direction and a counterclockwise direction in the side elevational views in FIGS. 18 through 20.

The sliding seat 11 is provided in the vicinity of respective rear ends of the right and left seat cushion frames 14 with a pair of upper arms: a left upper arm 40 and a right upper arm 60, each of which is pivoted at the rear end of the associated cushion frames 14 about a horizontal axis Hx. The aforementioned pair of seat back frames (not shown) are fixed to upper portions of the pair of upper arms 40 and 60, respectively, so that the angular position of the seat back 13 varies by a rotation of the pair of upper arms 40 and 60. The left upper arm 40 is biased in a direction to tilt the seat back 13 forward by a return spring (biasing device for tilting the seat back forward) 40a. Likewise, the right upper arm 60 is biased in a direction to tilt the seat back 13 forward by another return spring (biasing device for tilting the seat back forward) 60a.

Figure 17:
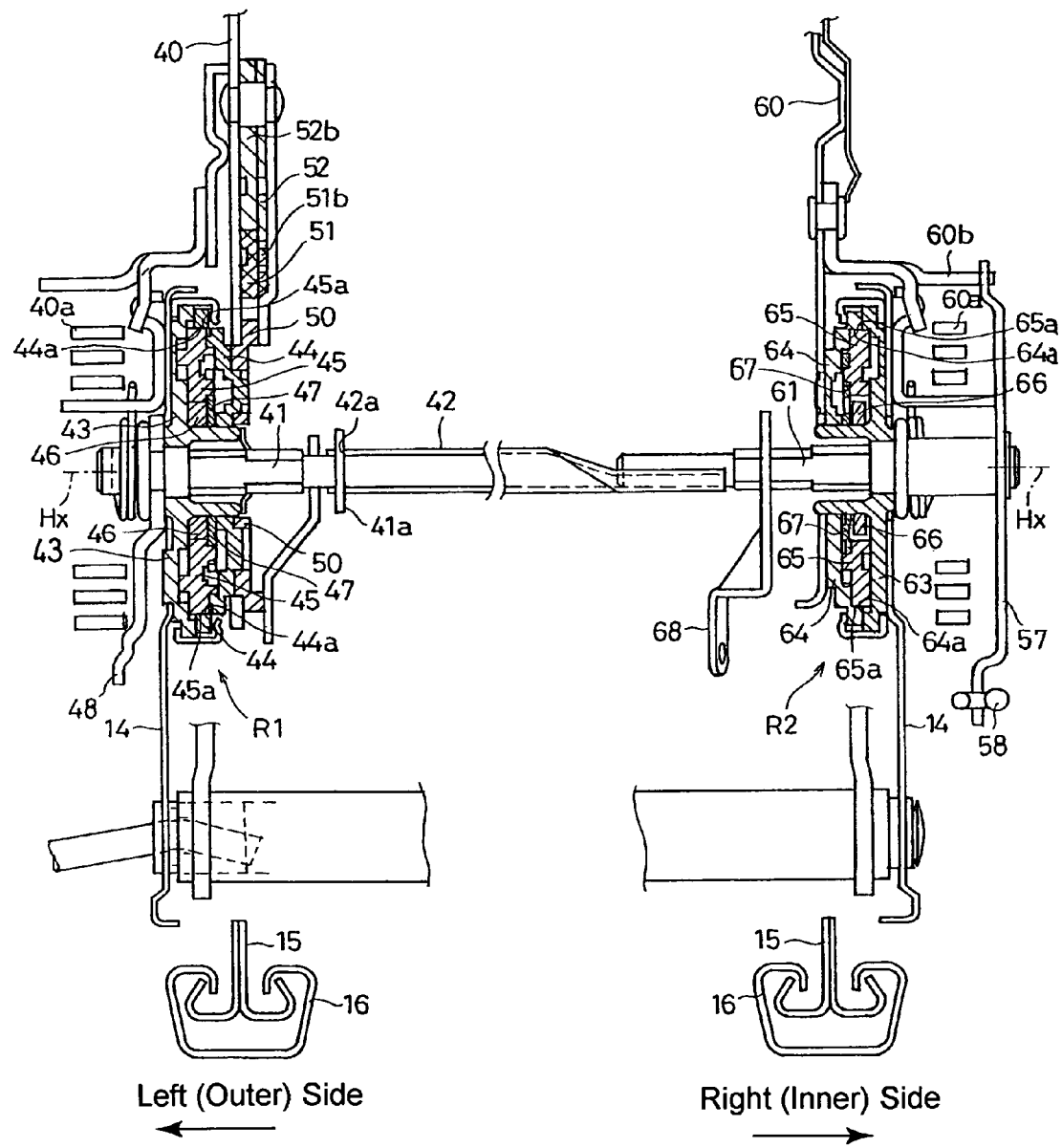
FIG. 17 is a rear elevational view, partly in cross section, of the seat back support mechanism.

The left upper arm 40 that is positioned on the left side of the sliding seat 11 (on vehicle's outer side) is supported by a hinge pin 41 via a seat back lock mechanism R1 (FIG. 17). The right upper arm 60 that is positioned on the right side of the sliding seat 11 (on vehicle's inner side) is supported by a hinge pin 61 via a seat back lock mechanism R2. The hinge pins 41 and 61 are supported by the left and right seat cushion frames 14, respectively, to be rotatable about a common axis: the horizontal axis Hx, and are inserted into a connecting pipe 42 from the opposite ends thereof. The connecting pipe 42 is allowed to rotate relative to the hinged pin 41, and is prevented from rotating relative to the hinged pin 61. An association pin 41a penetrates the hinge pin 41 (to which the connecting pipe 42 is allowed to relatively rotate) so that both ends of the association pin 41a which project radially outwards in opposite directions from the hinge pin 41 penetrate the connecting pipe 42 through a pair of circumferential slots 42a (see FIGS. 21 and 22), respectively, which are formed on the connecting pipe 42 to be elongated in a circumferential direction of the connecting pipe 42.

The seat back lock mechanism R1 is provided with a base arm 43, a lock plate 44, a movable lock member (holding device) 45, a cam member 46 and a release plate 47. The base arm 43 is fixed relative to the left seat cushion frame 14. The lock plate 44 is supported by the base arm 43 to be rotatable relative thereto about the horizontal axis Hx. The movable lock member 45 is supported by the base arm 43 to be movable in a radial direction of the horizontal axis Hx. The cam member 46 rotates together with the hinge pin 41 about the horizontal axis Hx. The release plate 47 rotates together with the cam member 46. The movable lock member 45 is provided on an outer edge thereof with an outer gear 45a, while the lock plate 44 is provided with an inner gear 44a which is engageable with the outer gear 45a. The cam member 46 moves the movable lock member 45 in a direction to make the outer gear 45a and the inner gear 44a engaged with each other (i.e., in a direction away from the horizontal axis Hx) by a rotation of the cam member 46 in a locking rotational direction thereof. When the cam member 46 rotates reverse in an unlocking rotational direction thereof, the release plate 47 that rotates together with the cam member 46 moves the movable lock member 45 in a direction to disengage the outer gear 45a and the inner gear 44a from each other. A combination of the cam member 46 and the release plate 47 is biased to rotate in the locking direction by a spring (not shown), and can be rotated in the unlocking direction by turning a reclining angle adjusting knob 48 which can be manually operated by a driver or a passenger who is seated in the sliding seat 11.

A ratchet (engaging member) 50 is coupled to the lock plate 44 without rotating relative to the lock plate 44. The ratchet 50 is fitted in a circular hole formed on the left upper arm 40 to be rotatable relative to the left upper arm 40 about the horizontal axis Hx. The ratchet 50 is provided on an outer edge thereof with a pair of memory recesses 50a and a forward-tilt lock recess 50b. A pawl (engaging member) 51 is positioned above the ratchet 50, and is pivoted about a rotational pin 51x fixed to the left upper arm 40. The pawl 51 is provided at a free end thereof with a pair of memory projections 51a. One of the pair of memory projections 51a which is closer to the rotational pin 51x, i.e., the radially inner memory projection 51ai (see FIG. 19), is engaged in the forward-tilt lock recess 50b when the seat back 13 is tilted forward. The forward-tilt lock recess 50b and the pair of memory projections 51a constitute a forward-tilt holding mechanism. The pawl 51 is further provided with an association pin 51b and a cam surface 51c.

A release lever 52 is positioned above the left upper arm 40, and is pivoted about a rotational pin 52x. The release lever 52 is provided with a pin insertion hole 52a, a sub-arm 52b, a spring-engaging arm 52c, and a wire cable engaging arm 52d. The sub-arm 52b rotates together with the release lever 52. The association pin 51b of the pawl 51 is inserted into the pin insertion hole 52a, while the cam surface 51c is positioned on a rotational moving path of the sub-arm 52b. One end of a tension spring (biasing member) 52e is engaged with the spring-engaging arm 52c, while one end of a walk-in wire cable 53 is engaged with the wire cable engaging arm 52d. The other end of the tension spring 52e is engaged with a bracket 54 which is fixed indirectly to the left upper arm 40 so that the release lever 52 is biased to rotate counterclockwise as viewed in FIG. 18 by the biasing force of the tension spring 52e. This biasing direction of rotating the release lever 52 counterclockwise causes the sub-arm 52b to depress the cam surface 51c. Therefore, when the release lever 52 is in a free state, the pawl 51 is held at an angular position (shown in FIG. 18) at which the pair of memory projections 51a are made to engage in the pair of memory recesses 50a by the biasing force of the tension spring 52e.

The sliding seat 11 is provided, on a back side thereof in the vicinity of the left side end (outer side end) of the seat back 13 with a walk-in lever 30 (see FIGS. 1 and 2). The walk-in wire cable 53 can be drawn by manually operating the walk-in lever 30. Drawing the walk-in wire cable 53 by manually operating the walk-in lever 30 causes the release lever 52 to rotate clockwise against the spring force of the tension spring 52e.

The seat back lock mechanism R2, via which the right upper arm 60 is supported by the hinge pin 61, has a mechanical structure basically the same as that of the seat back lock mechanism R1. Specifically, the seat back lock mechanism R2 is provided with a base arm 63, a lock plate 64, a movable lock member (holding device) 65, a cam member 66 and a release plate 67. The base arm 63 is fixed relative to the right seat cushion frame 14. The lock plate 64 is supported by the base arm 63 to be rotatable relative thereto about the horizontal axis Hx. The movable lock member 65 is supported by the base arm 63 to be movable in a radial direction of the horizontal axis Hx. The cam member 66 rotates together with the hinge pin 61 about the horizontal axis Hx. The release plate 67 rotates together with cam member 66. The movable lock member 65 is provided on an outer edge thereof with an outer gear 65a, while the lock plate 64 is provided with an inner gear 64a which is engageable with the outer gear 65a. The cam member 66 moves the movable lock member 65 in a direction to make the outer gear 65a and the inner gear 64a engaged with each other (i.e., in a direction away from the horizontal axis Hx) by a rotation of the cam member 66 in a locking rotational direction thereof. When the cam member 66 rotates reverse in an unlocking rotational direction thereof, the release plate 67 that rotates together with the cam member 66 moves the movable lock member 65 in a direction to disengage the outer gear 65a and the inner gear 64a from each other. A combination of the cam member 66 and the release plate 67 is biased to rotate in the locking direction by a spring (not shown).

Unlike the left upper arm 40's side, the lock plate 64 and the right upper arm 60 are coupled to each other to be rotatable together as one member with no ratchet being provided therebetween on the right upper arm 60's side. An association lever 68 is fixed to the hinge pin 61 to be rotatable therewith as one member (see FIGS. 17, 20 and 21). The association lever 68 is connected to the wire cable engaging arm 52d via an association wire cable 69.

Figure 19:
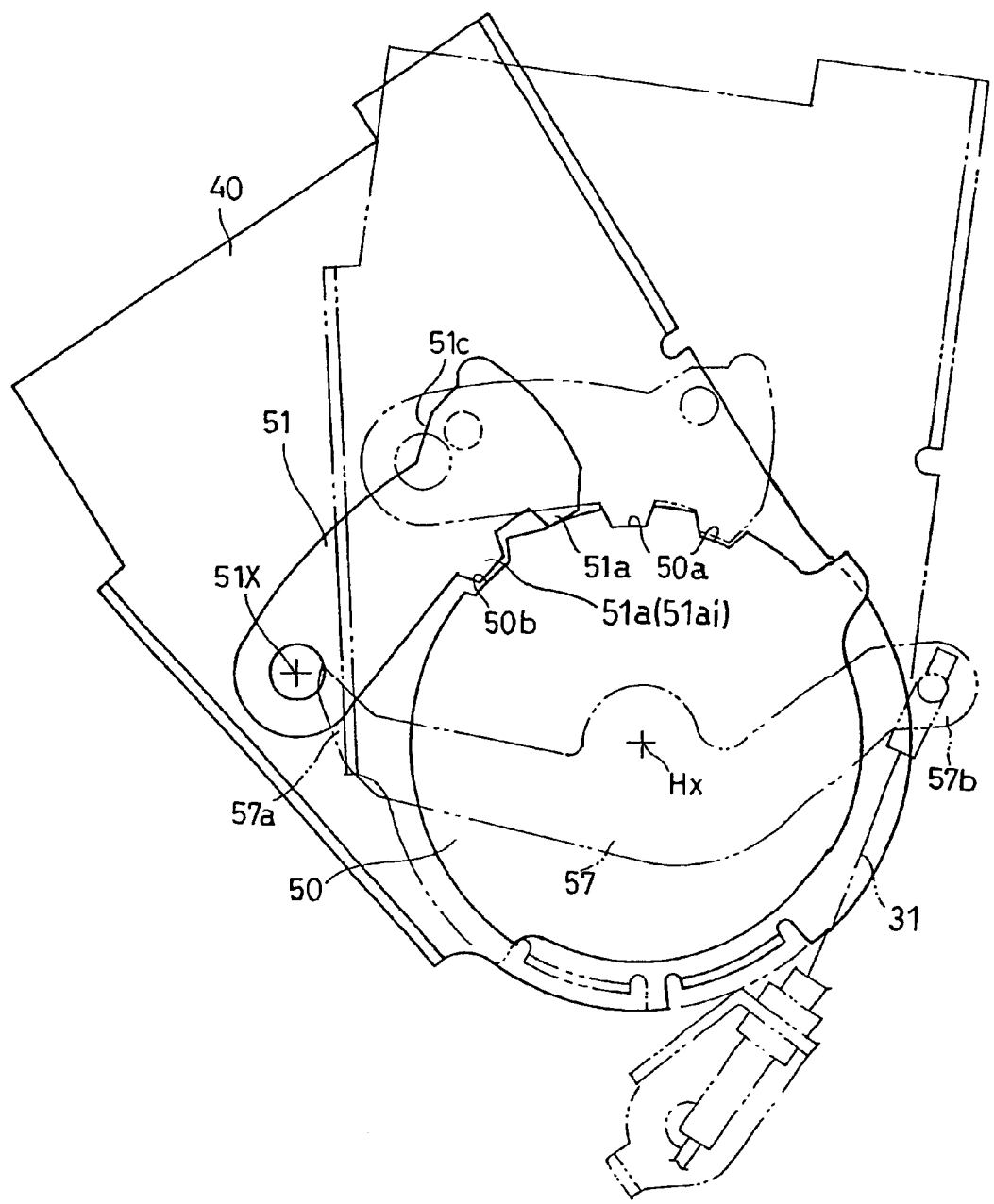
FIG. 19 is a side elevational view of the left upper arm shown in FIG. 18 and associated members, showing a state where the left upper arm is in a forward-tilted position.
Figure 20:
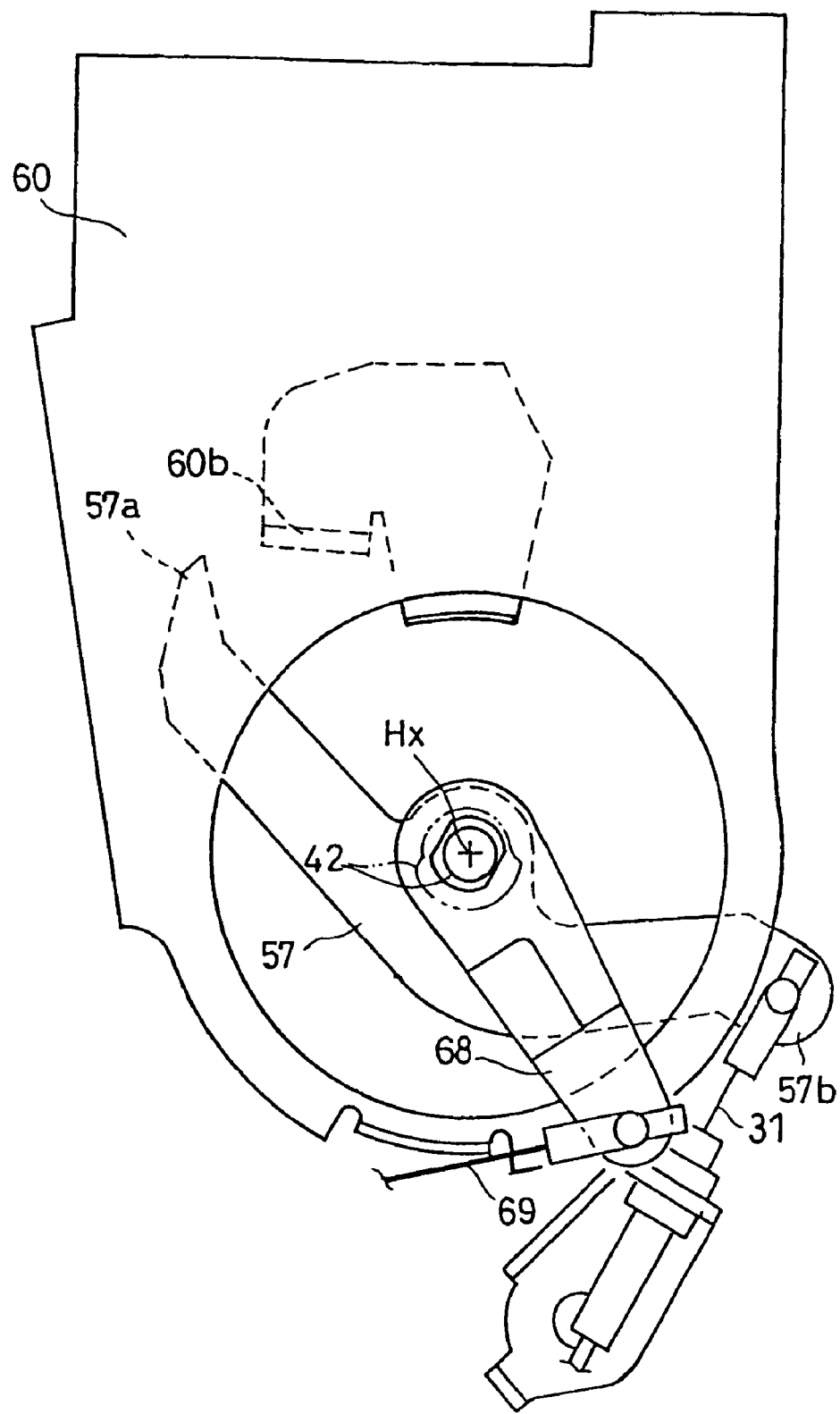
FIG. 20 is a side elevational view of a right upper arm and associated members.
Figure 21:
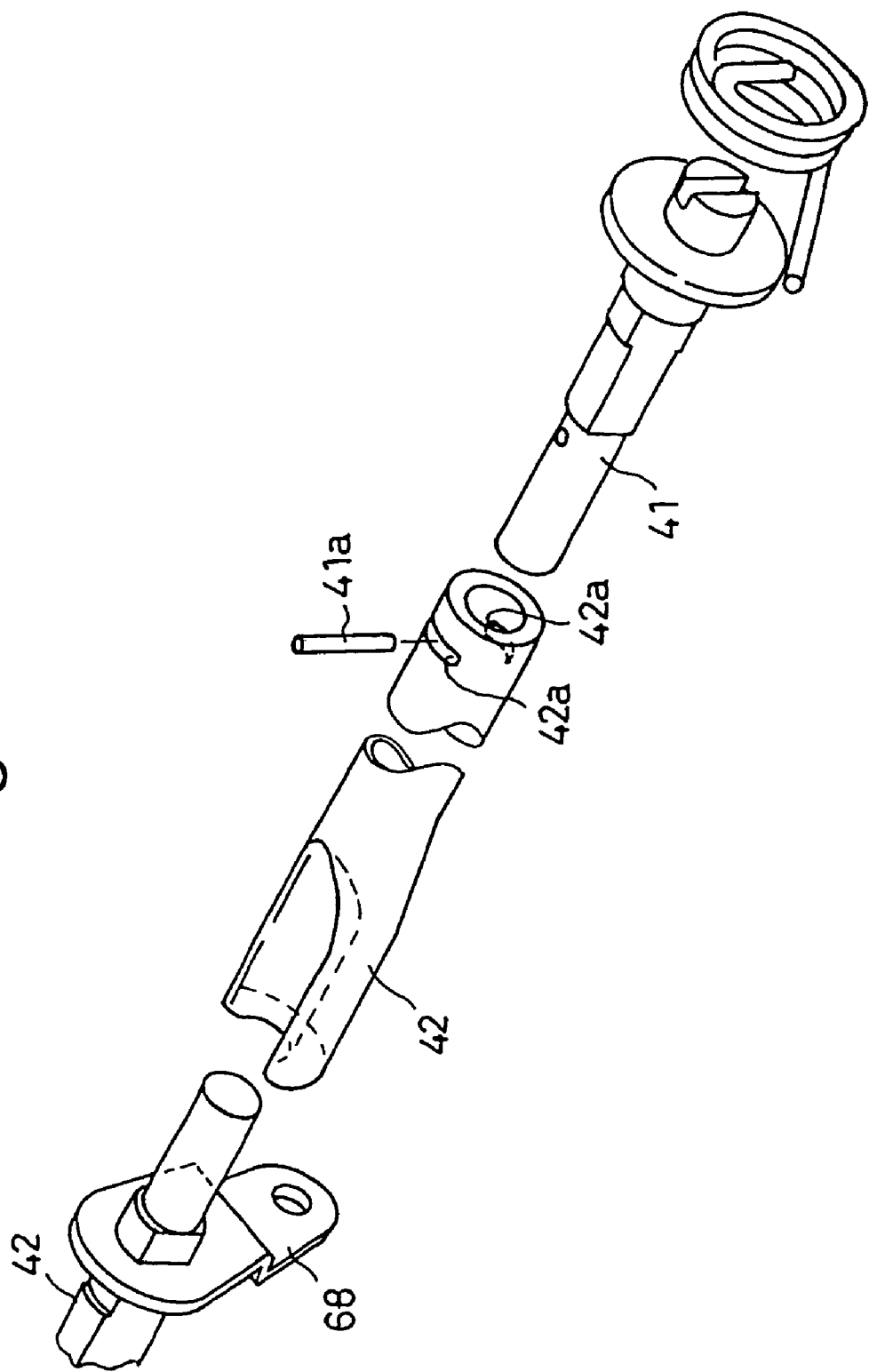
FIG. 21 is an exploded perspective view of a mechanism for connecting the left upper arm with the right upper arm.

On the right upper arm 60's side, a pull lever 57 is supported by the right upper arm 60 to be rotatable relative to the hinge pin 61. The pull lever 57 is provided with a pressed arm 57a and a wire cable engaging arm 57b. One end of a pull wire 31 is connected to the wire cable engaging arm 57b. The other end of the pull wire 31 is connected to the wire cable engaging arm 21b of the lock open lever 21. The pressed arm 57a of the pull lever 57 is positioned on a rotational moving path of an upper hook 60b fixed to the right upper arm 60. Although the pull lever 57 is supported by the right upper arm 60 as shown in FIGS. 17 and 20, the pull lever 57 is indicated by a phantom line (two-dot chain line) in FIGS. 18 and 19 for the purpose of illustrating operational states of the pull wire 31 (which is operated by the pull lever 57) in an easy-to-understand manner. The pull wire 31 is sheathed with a cable sheath 32 (see FIGS. 5 through 9). One end of the cable sheath 32 which is positioned adjacent to the wire cable engaging arm 21b of the lock open lever 21 is supported by a support plate 33 which is fixed to the left upper rail 15.

The pair of upper rails 15, the pair of lower rails 16, the seat cushion 12, the seat back 13, the slide lock mechanism (which includes the plurality of slide lock holes 16a and the bifurcated nail portion 17a) and the slide memory mechanism U1 constitute the seat mechanism devised according to the first aspect of the present invention. Operations of this seat mechanism of the sliding seat 11 will be discussed hereinafter. The sliding seat 11 in a normal seating state (upright position) is shown by solid lines in FIG. 1. When the sliding seat 11 is in the upright position, components of the slide lock mechanism and the slide memory mechanism U1 are in the state shown in FIG. 5 while a support mechanism for supporting the seat back 13 (the left upper arm 40) is in the state shown in FIG. 18. In this state, the slide lock member 17 is held in the locked position to prevent the sliding seat 11 from sliding on the pair of lower rails 16 by the engagement of the nail portion 17a with the slide lock holes 16a (see FIG. 12). In addition, the memory lock lever 28 is held in a memory lock position by the biasing force of the biasing spring 27 to prevent the memory unit MU1 from sliding on the memory rack 25 by the engagement of the two memory lock projections 28a with adjacent two of the memory lock holes 25a.

Figure 18:
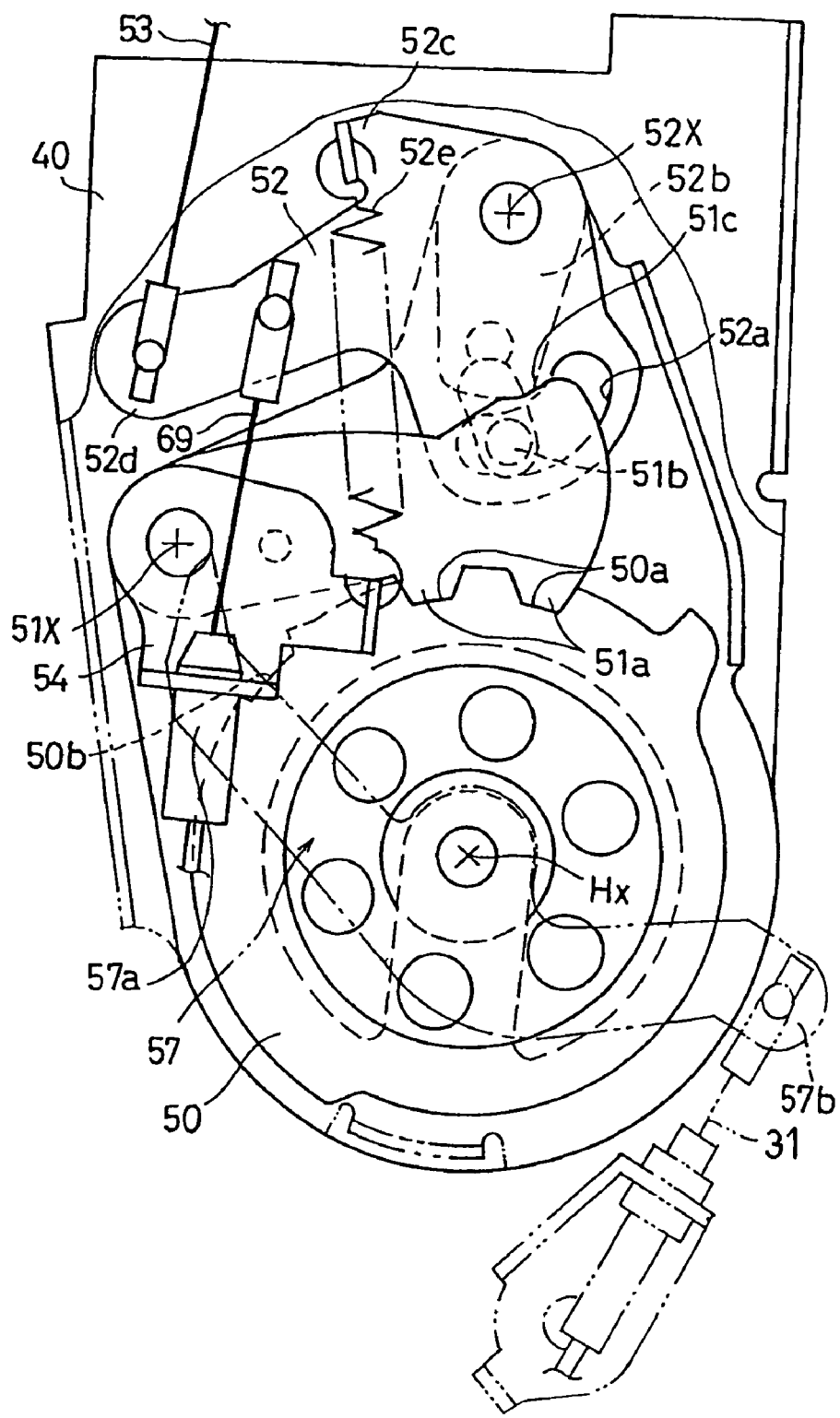
FIG. 18 is a side elevational view of a left upper arm and associated members.

On the other hand, in the support mechanism for supporting the seat back 13, the outer gear 45a of the movable lock member 45 and the outer gear 65a of the movable lock member 65, which serve as elements of the seat back lock mechanisms R1 and R2, prevent the lock plates 44 and 64 from rotating, respectively. As shown in FIG. 18, on the left upper arm 40's side, the pair of memory projections 51a of the pawl 51 are engaged in the pair of memory recesses 50a of the ratchet 50 that is coupled to the lock plate 44. The release lever 52 is biased to rotate in a direction of making the sub-arm 52b depressing the cam surface 51c so that the pair of memory projections 51a remain engaged in the pair of memory recesses 50a by the biasing force of the tension spring 52e. Namely, the lock plate 44, the ratchet 50 and the left upper arm 40 (the pawl 51) are locked to be prevented from rotating about the horizontal axis Hx. On the other hand, the right upper arm 60, together with the lock plate 64, is also prevented from rotating since the right upper arm 60 is coupled directly to the lock plate 64.

The reclining angle adjusting operation of the seat back 13 will be discussed hereinafter. Operating the reclining angle adjusting knob 48 when the sliding seat 11 is in a normal seating state (i.e., when the sliding seat 11 is in the upright position or a reclined position) causes the cam member 46 to rotate in the unlocking direction via the hinge pin 41 on the left upper arm 40's side to move the release plate 47, which rotates together with the cam member 46, in a direction to disengage the outer gear 45a and the inner gear 44a from each other (i.e., in a direction approaching the horizontal axis Hx). On the other hand, the ratchet 50 is rendered integral with the left upper arm 40 via the pawl 51 since the pair of memory projections 51a remain engaged in the pair of memory recesses 50a. Therefore, a combination of the lock plate 44, the ratchet 50 and the left upper arm 40 becomes rotatable about the horizontal axis Hx relative to the base arm 43.

Figure 22:
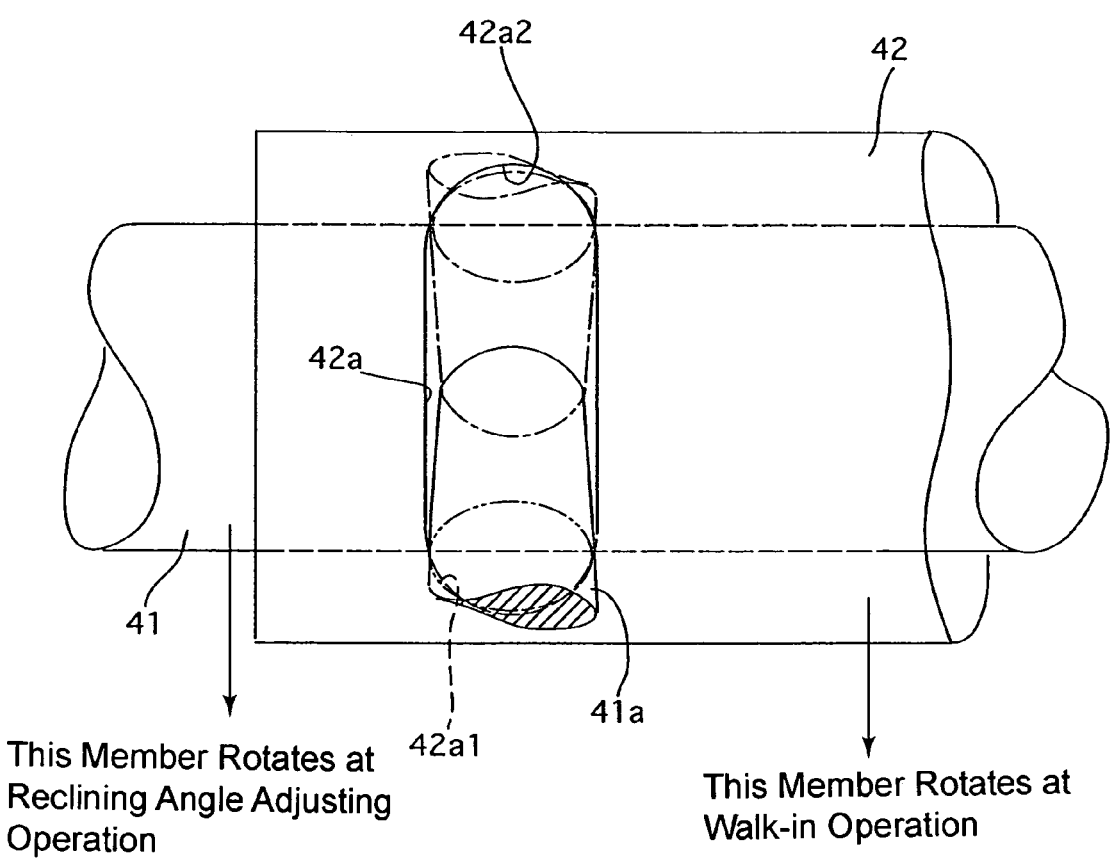
FIG. 22 is a conceptual diagram showing the relationship between an association pin and an elongated hole in the connecting mechanism shown in FIG. 21.

As shown by solid lines in FIG. 22, the opposite ends of the association pin 41a of the hinge pin 41 are in contact with diametrically-opposed first circumferential ends 42a1 of the pair of circumferential slots 42a of the connecting pipe 42, respectively, when the sliding seat 11 is in the upright position. The rotation of the hinge pin 41 by the aforementioned operation of the reclining angle adjusting knob 48 causes the association pin 41a of the hinge pin 41 to rotate together with the hinge pin 41, thus causing the opposite ends of the association pin 41a to press the diametrically-opposed circumferential ends (engaging ends) 42a1, respectively, so that the connecting pipe 42 rotates together with the hinge pin 41. This rotation of the connecting pipe 42 causes the hinge pin 61, which is positioned on the right upper arm 60's side, to rotate along with the connecting pipe 42, so that the combination of the cam member 66 and the release plate 67 rotates in the unlocking direction. This causes the movable lock member 65 to move in a direction of approaching the horizontal axis Hx to disengage the outer gear 65a and the inner gear 64a from each other. Namely, a combination of the lock plate 64 and the right upper arm 60 becomes rotatable about the horizontal axis Hx relative to the base arm 63.

Since each of the left upper arm 40 and the right upper arm 60 is unlocked as a result of operation of the reclining angle adjusting knob 48 as described above, the reclining angle of the seat back 13 can be freely adjusted. After the completion of this adjustment, the left upper arm 40 and the right upper arm 60 are locked again only if the operation of the reclining angle adjustment knob 48 is manually stopped.

Figure 8:
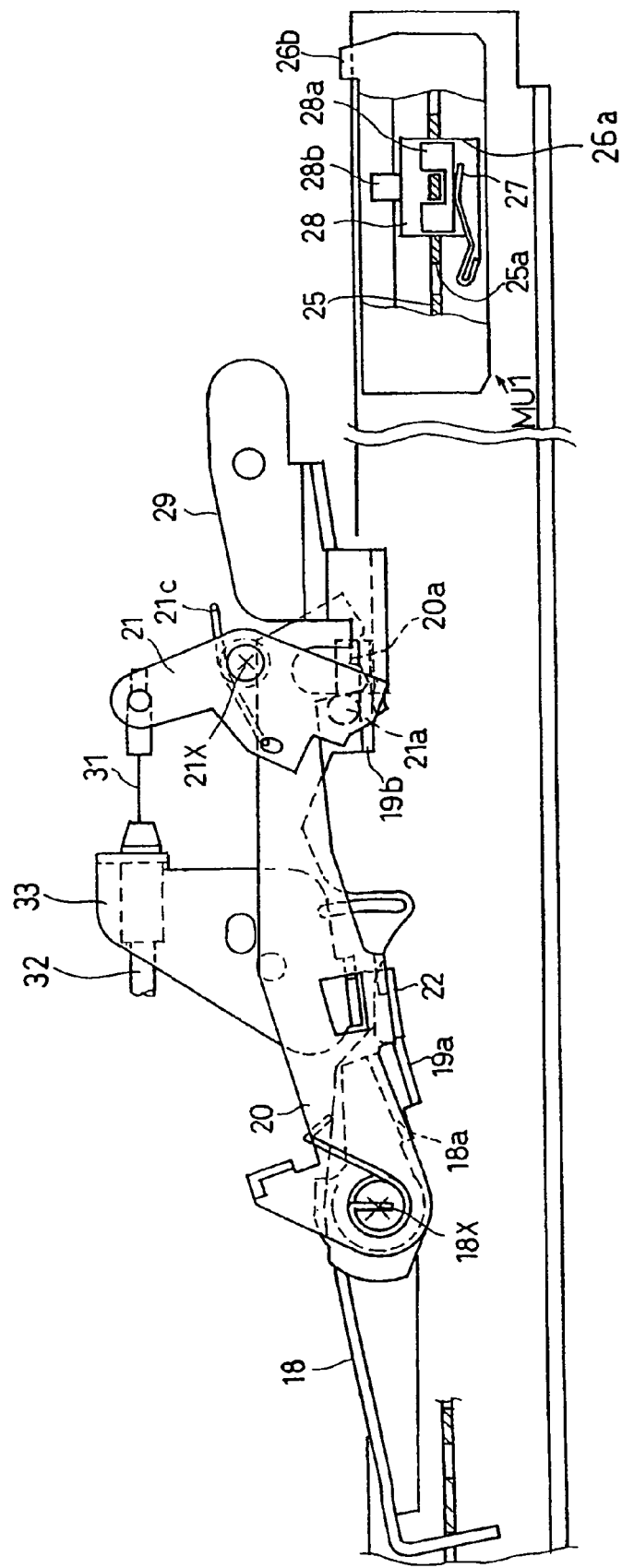
FIG. 8 is a side elevational view of the seat slide mechanism in a walk-in state in which the front sliding seat is manually operated to slide forward while leaving a memory unit.
Figure 9:
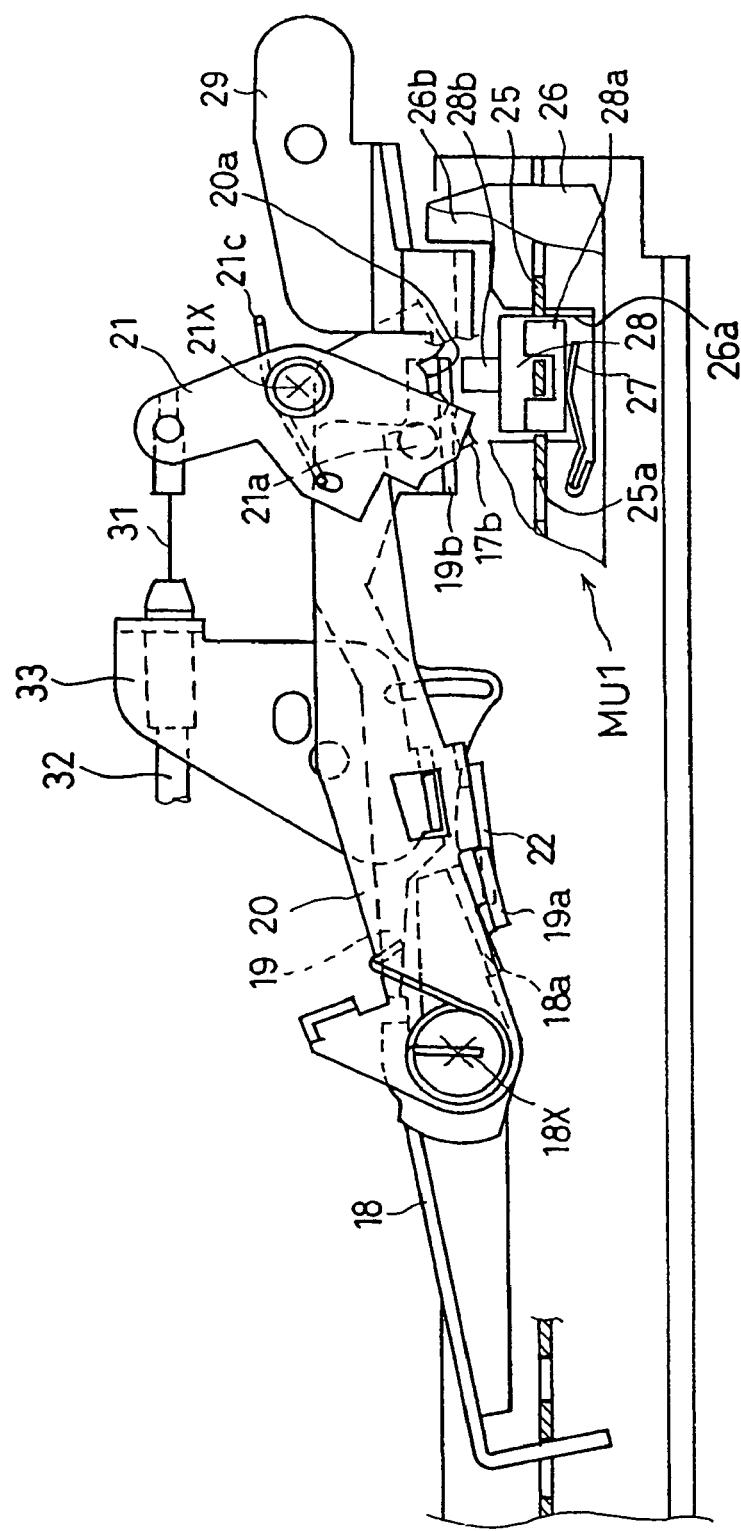
FIG. 9 is a side elevational view of the seat slide mechanism in a state where the front sliding seat is manually operated to slide rearward to the position of its previous adjustment which is remembered by a slide position memory mechanism.
Figure 13:
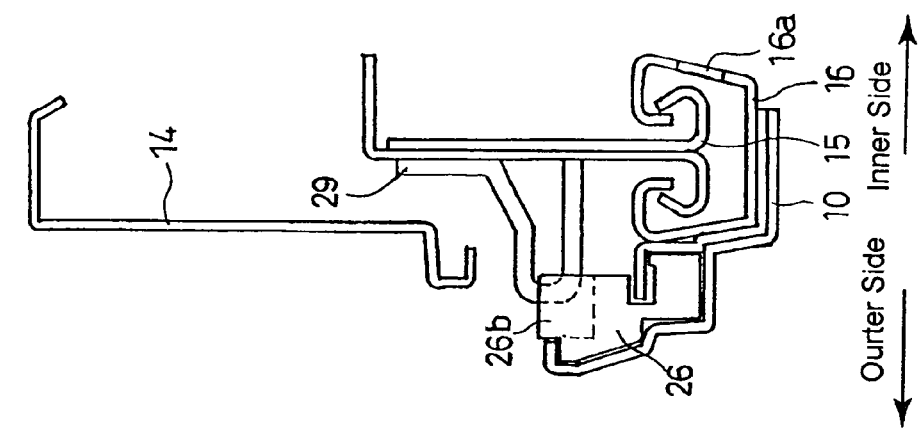
FIG. 13 is a cross sectional view taken along C'—C' line shown in FIG. 7, showing a lock released state of the slide lock mechanism.
Figure 14:
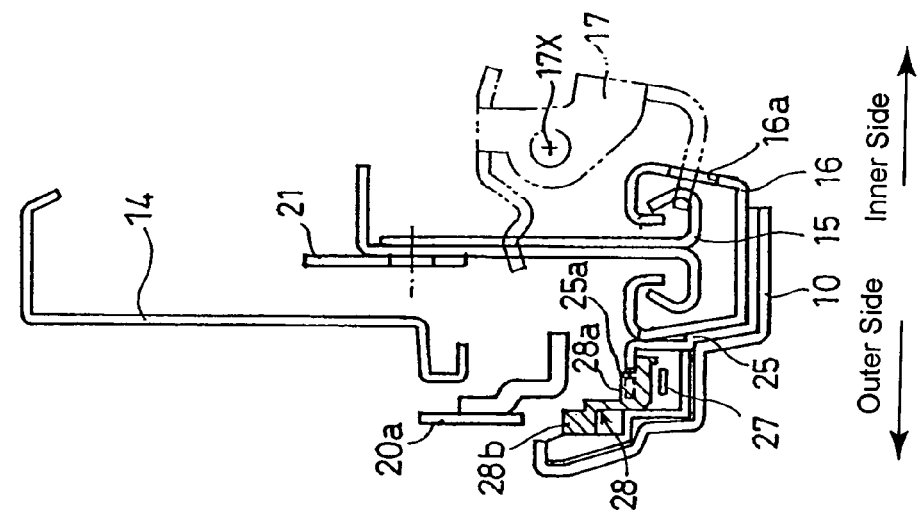
FIG. 14 is a cross sectional view taken along D—D line in FIG. 5.
Figure 15:
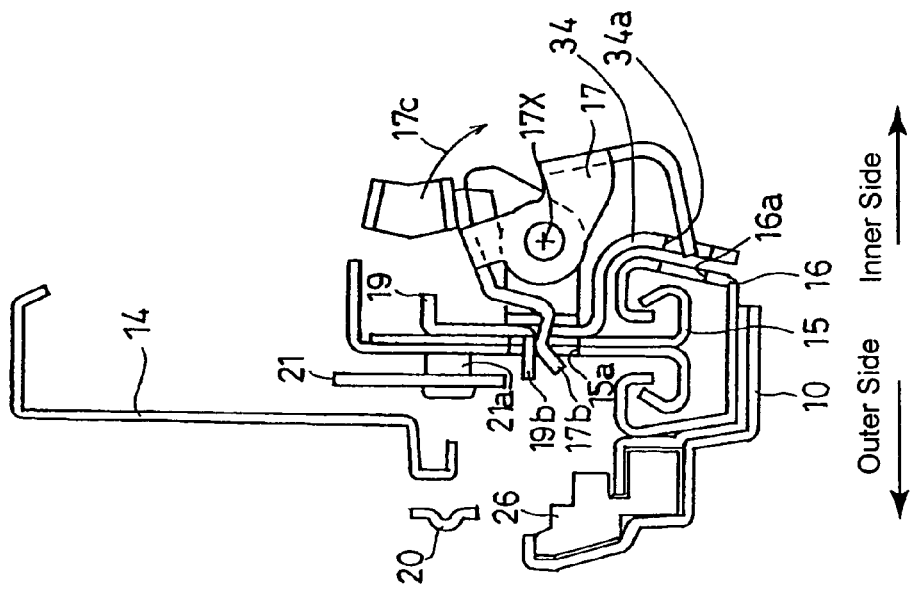
FIG. 15 is a cross sectional view taken along E—E line in FIG. 5.
Figure 16:
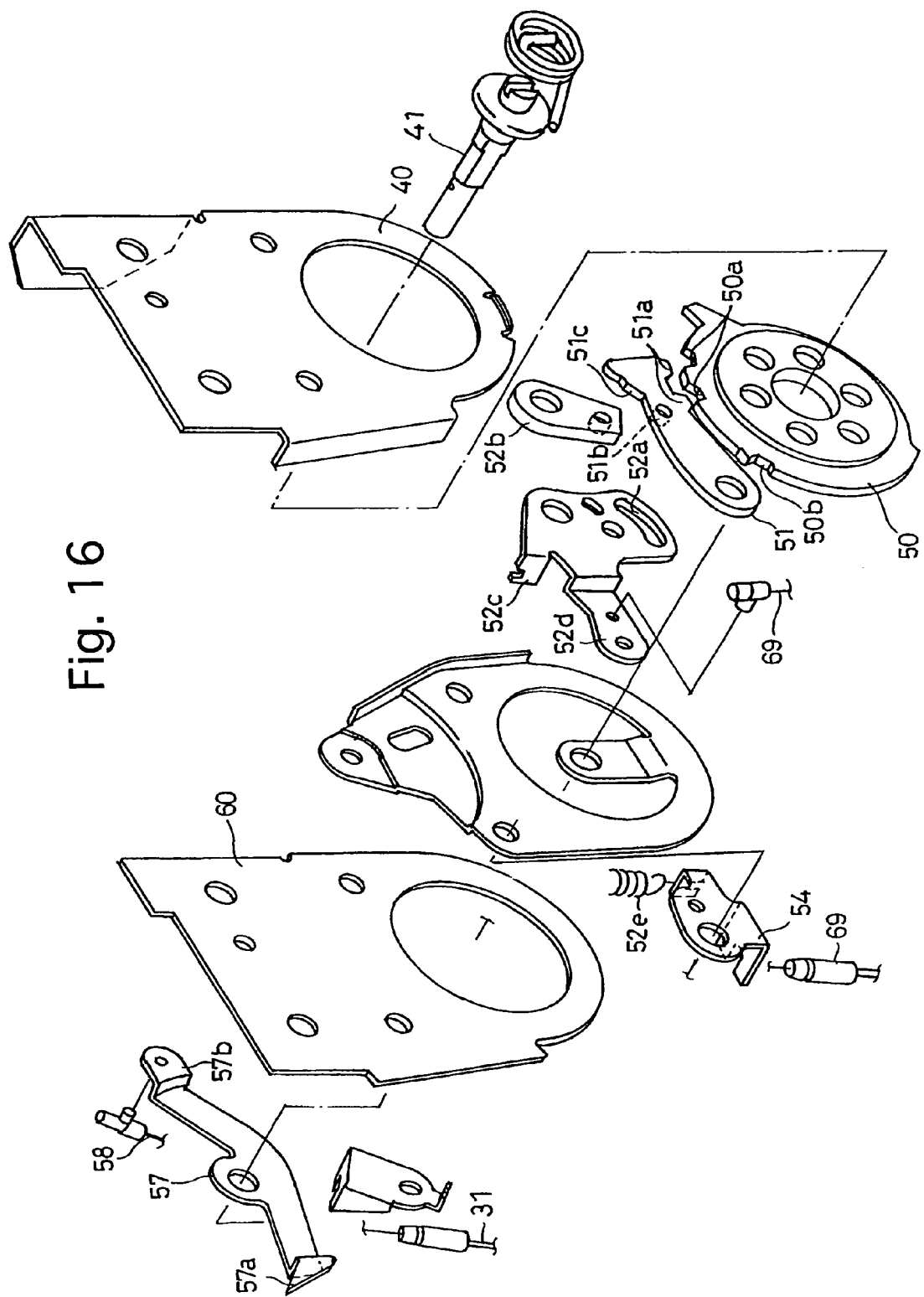
FIG. 16 is an exploded perspective view of a portion of a seat back support mechanism.

The normal seat slide operation for manually adjusting the position of the sliding seat 11 in a forward/rearward direction thereof by one who is seated in the sliding seat 11 will be discussed hereinafter. Manually lifting the loop handle 18b when the sliding seat 11 is in a normal seating state causes each loop-handle bracket 18 to rotate clockwise from the position shown in FIG. 5 to the position shown in FIG. 6, and this rotation of each loop-handle bracket 18 causes the pressing portion 18a thereof to press the pressed portion 19a of the associated lock open bracket 19 so that each lock open bracket 19 rotates clockwise. This rotation of each lock open bracket 19 causes the pressing portion 19b thereof to press the pressed arm portion 17b of the associated slide lock member 17 so that each slide lock member 17 rotates in the unlocking direction against the spring force of the biasing spring 17c (see FIG. 13). This causes the bifurcated nail portion 17a of each slide lock member 17 to be disengaged from the slide lock holes 16a of the associated lower rail 16 so that the pair of upper rails 15 can freely slide on the pair of lower rails 16 to allow the position of the sliding seat 11 to be adjusted in the forward/rearward direction thereof. Upon this disengagement of each slide lock member 17 from the slide lock holes 16a of the associated lower rail 16, the pair of upper rails 15 move forward relative to the pair of lower rails 16 by the biasing force of the biasing spring 15F (see FIG. 8; however, FIG. 8 shows a walk-in state (which will be discussed later) in which the position of the memory unit MU1 is different from the position in a normal slide state) because the pair of upper rails 15 are continuously biased forward by the biasing force of the biasing spring 15F. In such a state where the pair of upper rails 15 are allowed to slide on the pair of lower rails 16, it is possible to slide the sliding seat 11 rearward against the biasing force of the biasing spring 15F.

On the other hand, the rotation of the loop-handle bracket 18 causes the stop lever 22 to rotate together with the loop-handle bracket 18. This rotation of the stop lever 22 causes the catch lever 20, which is coupled to the stop lever 22 via the torsion spring 20b, to rotate clockwise. Upon this clockwise rotation of the catch lever 20, the engaging recess 20a is engaged with the engaging projection 28b of the memory lock lever 28, and a further clockwise rotation of the catch lever 20 causes the engaging recess 20a to depress the memory lock lever 28 to thereby move the memory lock lever 28 downward from the memory position (in which the two memory lock projections 28a of the memory lock lever 28 are engaged in adjacent two of the plurality of memory lock holes 25a) to the memory release position (in which the two memory lock projections 28a of the memory lock lever 28 are disengaged from the plurality of memory lock holes 25a). This releases the lock for preventing the memory unit MU1 from moving relative to the memory track 25. Therefore, sliding the sliding seat 11 (the pair of upper rails 15) on the pair of lower rails 16 forward, as shown by two-dot chain lines in FIG. 1, causes the memory unit MU1 to slide on the memory rack 25 together with the sliding seat 11 because the catch lever 20 and the memory lock lever 28 are integral with each other at this stage. Subsequently, releasing the loop handle 18b causes the slide lock member 17 to return to the locked position, so that the bifurcated nail portion 17a of the slide lock member 17 is engaged with the slide lock holes 16a to lock the sliding seat 11, and at the same time the memory lock lever 28 returns to the memory position.

The walk-in operation will be discussed hereinafter. Manually turning the walk-in lever 30 with no one seated in the sliding seat 11 causes the walk-in wire cable 53 to be drawn by the walk-in lever 30 to thereby rotate the release lever 52 clockwise from the position shown in FIG. 18 against the biasing force of the tension spring 52e. Upon this clockwise rotation of the release lever 52, the pin insertion hole 52a lifts the association pin 51b to rotate the pawl 51 counterclockwise to thereby disengage the pair of memory projections 51a from the pair of memory recesses 50a. Consequently, the left upper arm 40 and the ratchet 50 are disengaged from each other, and accordingly, the left upper arm 40 becomes capable of rotating freely relative to the ratchet 50.

The rotation of the release lever 52 causes the association wire cable 69 to be drawn, thus causing the association lever 68 to rotate clockwise as viewed in FIG. 20. At this time, the hinge pin 61 that is coupled to the association lever 68 rotates in the same rotational direction. Similar to the case of the above described reclining angle adjusting operation of the seat back 13, this rotation of the hinge pin 61 causes the cam member 66 and the release plate 67 to rotate together in the unlocking direction via the hinge pin 61 to move the release plate 67, which rotates together with the cam member 66, in a direction to disengage the outer gear 65a of the movable lock member 65 and the inner gear 64a of the lock plate 64 from each other. This unlocks the seat back lock mechanism R2 to thereby make it possible for the right upper arm 60 to rotate. On the other hand, although the connecting pipe 42 rotates together with the hinge pin 61, during this rotation the pair of circumferential slots 42a rotate about the horizontal axis Hx relative to the association pin 41a (while making opposite side edges of each circumferential slot 42a sliding on the association pin 41a) so that no rotational force is transferred to the association pin 41a from the connecting pipe 42. Namely, the end of the association pin 41a in the associated circumferential slot 42a relatively moves from the diametrically-opposed first circumferential end 42a1 to a diametrically-opposed second circumferential end 42a2 as shown in FIG. 22 by one-dot chain lines. Therefore, the hinge pin 41 does not rotate, and accordingly, a lock in the seat back lock mechanism R1 is not released; in other words, the ratchet 50 and the left upper arm 40 (the pawl 51) remain locked so that the ratchet 50 is prevented from rotating about the horizontal axis Hx.

In the present embodiment of the sliding seat, a control mechanism for controlling the linkage between the seat back lock mechanism R1 and the seat back lock mechanism R2 between the time of the reclining angle adjusting operation and the time of the walk-in operation (the time at which a reclining angle of the seat back 13 is remembered) is composed of the association pin 41a on the hinge pin 41's side and the pair of circumferential slots 42a on the connecting pipe 42's side, and is accordingly simple in structure. Such a linkage control is performed with a plurality of levers in a conventional linkage control mechanism. Hence, the linkage control mechanism in the present embodiment of the seat mechanism has a smaller number of components than the conventional linkage control mechanism, thus being capable of being constructed with a greater precision at a low cost.

Immediately after each of the left upper arm 40 and the right upper arm 60 is unlocked in the above described manner, the seat back 13 starts tilting forward by the biasing force of the return springs 40a and 60a. Since the ratchet 50 does not rotate during this forwardly tilting motion of the seat back 13, the pawl 51 moves along the outer edge of the ratchet 50 in accordance with the forward tilting motion of the seat back 13. Immediately after the seat back 13 reaches its forward-tilted position shown by one-dot chain line in FIG. 2, the radially inner memory projections 51ai of the pawl 51 is engaged with the forward-tilt lock recess 50b as shown in FIG. 19. The biasing force of the tension spring 52e biases the pawl 51 in a direction to make the radially inner memory projections 51ai of the pawl 51 and the forward-tilt lock recess 50b remained engaged with each other.

When the right upper arm 60 tilts forward, the upper hook 60b presses the pressed arm 57a of the pull lever 57 to rotate the pull lever 57 counterclockwise. Upon this counterclockwise rotation of the pull lever 57, the pull wire 31 (whose tension is loosened) is stretched and pulled by the wire cable engaging arm 57b. This pulling operation of the pull wire 31 by the wire cable engaging arm 57b causes the lock open lever 21 to rotate counterclockwise against the biasing force of the torsion spring 21c from the position shown in FIG. 5 to the position shown in FIG. 7. This counterclockwise rotation of the lock open lever 21 causes the pressing pin 21a to press the pressing portion 19b of the lock open bracket 19, thus causing each lock open bracket 19 to rotate clockwise. Similar to the case of the above described normal seat slide operation, this rotation of each lock open bracket 19 causes the pressing portion 19b thereof to press the pressed arm portion 17b of the associated slide lock member 17, thus causing each slide lock member 17 to rotate in an unlocking direction to thereby disengage the bifurcated nail portion 17a from the slide lock holes 16a on the associated lower rail 16 against the spring force of the biasing spring 17c (see FIG. 13). Although the pressing pin 21a does not press the pressing portion 19b of the lock open bracket 19 in the drawing of FIG. 13, this is the case in the above described normal seat slide operation; the pressing pin 21a moves downward from the position thereof shown in FIG. 13 to depress the pressing portion 19b of the lock open bracket 19 in the walk-in operation. At this time, since the pressed portion 19a of the lock open bracket 19 moves away from the pressing portion 18a, the loop-handle bracket 18 does not rotate. At the same time, either the stopper lever 22 or the catch lever 20 does not rotate. If the catch lever 20 does not rotate, the memory lock lever 28 does not move from the memory position thereof (the position shown in FIGS. 5, 7 through 9, and 14). Namely, the memory unit MU1 becomes immovable relative to the memory rack 25 (i.e., the memory unit MU1 is in the state shown in FIG. 7) though the sliding seat 11 (the pair of upper rails 15) can slide on the pair of lower rails 16.

Since the pair of upper rails 15 are continuously biased forward by the biasing spring 15F as mentioned above, each slide lock member 17 rotates in the unlocking direction as a result of the walk-in operation. Upon this rotation of each slide lock member 17, the pair of upper rails 15 move forward relative to the pair of lower rails 16 by the biasing force of the biasing spring 15F (see FIG. 8). At this time, the memory unit MU1 remains at its previous position after the sliding seat 11 has been moved forward relative to the pair of lower rails 16. This state is the walk-in state shown by two-dot chain lines in FIG. 2.

When it is desired to return the sliding seat 11 to the upright position (shown by solid lines in FIG. 2) from the walk-in state, the sliding seat 11 needs to be moved rearward. This rearward movement of the sliding seat 11 causes the slide stop 29 to come into contact with the stop projection 26b of the slide member 26 to thereby prevent the sliding seat 11 from further moving rear ward. Since the slide member 26 has not moved from the beginning of the walk-in operation, this position (rearward movement prevention position) of the slide member 26 corresponds to that position of the previous adjustment to the sliding seat 11 which is remembered by the slide position memory mechanism. If the seat back 13 is pivoted toward the upright position from the forward-tilted position, the tension in the pull wire 31 is loosened, so that the lock open lever 21 rotates clockwise back to the position shown in FIG. 5 at which the seat back 13 is in the upright position. This clockwise rotation of the lock open lever 21 causes the lock open bracket 19 to stop pressing the pressed arm portion 17b of the left slide lock member 17, thus causing the slide lock member 17 to return to the locked position, in which the pair of upper rails 15 are prevented from moving relative to the pair of lower rails 16.

In addition, if the seat back 13 is returned to the upright position from the forward-tilted position, each of the seat back lock mechanism R1 and the seat back lock mechanism R2 returns to the normal seating state described above. More specifically, although the seat back lock mechanism R1 on the left upper arm side is originally in a locked position (in which the inner gear 44a of the lock plate 44 is engaged with the outer gear 45a of the movable lock member 45), the return of the left upper arm 40 to the previous angular position thereof which is set before the forward pivoting motion of the left upper arm 40 causes the pawl 51 to move to the position where the pair of memory projections 51a of the pawl 51 face the pair of memory recesses 50a. Thereupon, the pawl 51 becomes able to rotate clockwise as viewed in FIG. 18, so that the release lever 52, which is biased by the tension spring 52e, rotates counterclockwise as viewed in FIG. 18. This counterclockwise rotation of the release lever 52 causes the sub-arm 52b to depress the cam surface 51c of the pawl 51 so that the pawl 51 rotates to its rotational position where the pair of memory projections 51a of the pawl 51 are engaged in the pair of memory recesses 50a. This prevents the ratchet 50 and the pawl 51 from rotating relative to each other, thus preventing the left upper arm 40 from pivoting relative to the base arm 43. Since the ratchet 50 has not rotated from the beginning of the walk-in operation, such a rotational movement prevention position corresponds to that angular position of the previous adjustment to the seat back 13 which is remembered by the angle memory mechanism. On the other hand, when the pawl 51 rotates clockwise in a direction so as to engage the pair of memory projections 51a of the pawl 51 into the pair of memory recesses 50a of the ratchet 50, the release lever 52 rotates counterclockwise while pressing the pawl 51 in a direction of urging the pair of memory projections 51a to be engaged in the pair of memory recesses 50a, and at the same time the tension in the association wire cable 69 is loosened in accordance with this rotation of the release lever 52. Since the association lever 68 becomes free of the pulling power of the association wire cable 69 immediately after the tension in the association wire cable 69 is loosened, the cam member 66, which is an element of the seat back lock mechanism R2 on the right upper arm 60's side, becomes capable of rotating in the locking direction. Thereupon, the cam member 66 rotates in the locking direction by the biasing force of a spring (not shown) to move the movable lock member 65 in a direction away from the horizontal axis Hx. This movement of the movable lock member 65 brings the outer gear 65a into engagement with the inner gear 64a of the lock plate 64 to thereby lock the seat back lock mechanism R2 on the right upper arm 60's side.

As can be understood from the above descriptions of the walk-in operation, the seat-back forward tilting operation and the seat-back returning operation of the seat back 13 are associated with the slide lock mechanism of the sliding seat 11 so that the pair of upper rails 15 are unlocked relative to the pair of lower rails 16 when the seat back 13 is tilted forward and so that the pair of upper rails 15 are locked relative to the pair of lower rails 16 when the seat back 13 is returned to the upright position. Therefore, the sliding seat 11 is locked not to slide on the pair of lower rails 16 by returning the seat back 13 to the upright position from the forward-tilted position even if the sliding seat 11 is not moved rearward to the memory position shown in FIG. 9. However, if the seat back 13 is unintentionally returned to the upright position in such a manner, the slide position memory will not be used effectively. Conversely, in the case where the sliding seat 11 cannot be moved rearward sufficiently to the memory position due to a bulky luggage or the like in the rear seat, one may return the forwardly-tilted seat back 13 to the upright position from the forward-tilted position to sit in the sliding seat 11 in the full knowledge that the sliding seat 11 may not be moved rearward to the memory position. In such a case, it is desirable that the slide lock mechanism be locked even if the sliding seat 11 does not move rearward to the memory position. Although a seat mechanism in which a slide lock of a sliding seat is constructed so as not to be locked though the seat back can be returned to the upright position in the case of not making the sliding seat move rearward to its previously-set memory position is known in the art (disclosed in, e.g., Japanese Unexamined Patent Publication No.11-321393) as mentioned above, it is not desirable that this conventional type of seat mechanism be used for a sliding seat, especially for a driver's seat for safety reasons because the sliding seat becomes available for sitting even if the slide lock thereof is not locked.

To prevent such a problem which resides in the conventional type of seat mechanism from occurring, the present embodiment of the seat mechanism is provided with a first embodiment of a forward-tilt holding mechanism for holding the seat back 13 in its forward-tilted position during the rearward movement of the sheet back 11 to the position of its previous adjustment which is remembered by the slide position memory mechanism. With this forward-tilt holding mechanism, if the sliding seat 11 cannot be moved rearward (or is not moved rearward intentionally) to the position of its previous adjustment which is remembered by the slide position memory mechanism, the sliding seat 11 is locked not to slide on the pair of lower rails 16 to ensure safety simply by returning the seat back 13 to the upright position. More specifically, the radially inner memory projections 51*ai* of the pawl 51 are engaged with the forward-tilt lock recess 50*b* in a state where the seat back 13 it tilted forward as described above. This engagement of the radially inner memory projections 51*ai* of the pawl 51 with the forward-tilt lock recess 50*b* is held indirectly by the spring force of the tension spring 52*e*, and gives a resistance force to a pivoting motion of the left upper arm 40 independently of the biasing force of the return springs 40*a* and 60*a* (which bias the seat back 13 in a direction to tilt forward) when the left upper arm 40 is made to rotate toward the upright position (clockwise) from the position shown in FIG. 19. The magnitude of that resistance force is predetermined so that the seat back 13 is not rotated back to the upright position even if being pushed by hand when one moves the sliding seat rearward, and so that the left upper arm 40 rotates when one intentionally rotates the seat back 13. For instance, although the seat back 13 is continuously biased in a direction to be pivoted forward by the pair of return springs 40*a* and 60*a*, the magnitude of the resistance force in the engagement of the radially inner memory projections 51*ai* of the pawl 51 with the forward-tilt lock recess 50*b* when the seat back 13 is pivoted back to the upright position is predetermined to be greater than at least the magnitude of the resistance force in the pair of return springs 40*a* and 60*a* when the seat back 13 is pivoted back to the upright position. These resistance forces can be adjusted by modifying at least one of the number and the shape of each of radially inner memory projections 51*ai* and the forward-tilt lock recess 50*b* and/or by selecting the tension spring 52*e* from among a plurality of tension springs having different spring forces.

Immediately after the slide stop 29 comes into contact with the stop projection 26*b* of the slide member 26 by the rearward movement of the sliding seat 11 to the position of its previous adjustment which is remembered by the slide position memory mechanism, a further rearward movement of the sliding seat 11 is prevented due to the engagement of the slide stop 29 with the stop projection 26*b*. Since the operation pivoting the seat back 13 to the upright position includes a component of an operational force moving the sliding seat 11 rearward, the point of the engagement of the slide stop 29 with the stop projection 26*b* becomes a point of support which meets with the resistance force in the operation pivoting the seat back 13 to the upright position. This makes it easier to return the seat back 13 to the upright position from the forward-tilted position than the case that the sliding seat 11 is freely slidable on the pair of lower rails 16. If a predetermined force is exerted on the seat back 13 to return the seat back 13 to the upright position from the front-tilt position, the pawl 51 rotates counterclockwise to disengage the radially inner memory projections 51*ai* of the pawl 51 from the forward-tilt lock recess 50*b* of the ratchet 50. Thereafter, the left upper arm 40, together with the right upper arm 60, pivots toward the upright position so that the pair of memory projections 51*a* of the pawl 51 are engaged in the pair of memory recesses 50*a* of the ratchet 50 at that angular position of the previous adjustment to the seat back 13 which is remembered by the angle memory mechanism.

Figure 23:
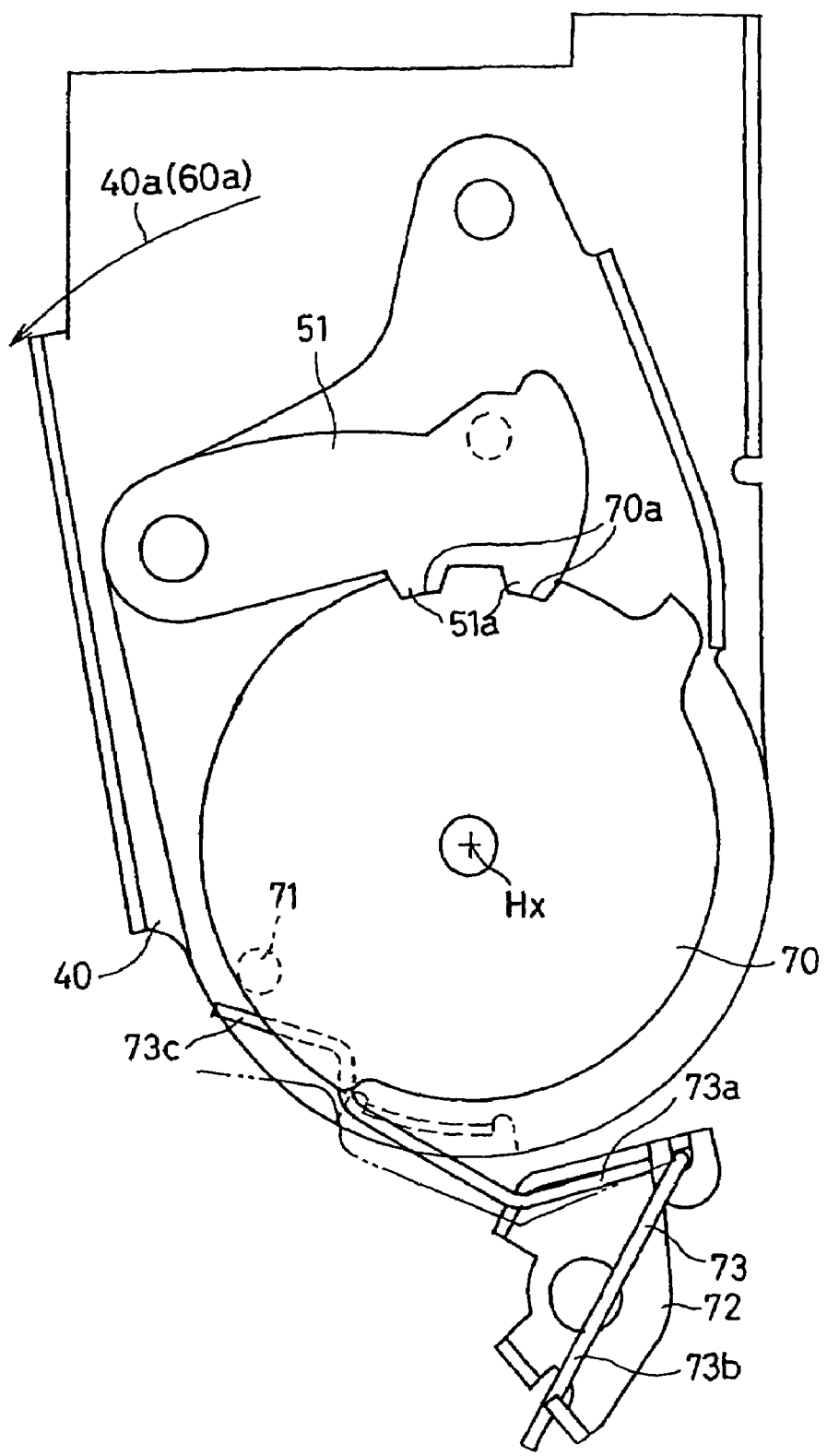
FIG. 23 is a side elevational view of a left upper arm and associated members in a second embodiment of the seat mechanism for vehicle according to the first aspect of the present invention in a state where the seat back is in the upright position.
Figure 24:
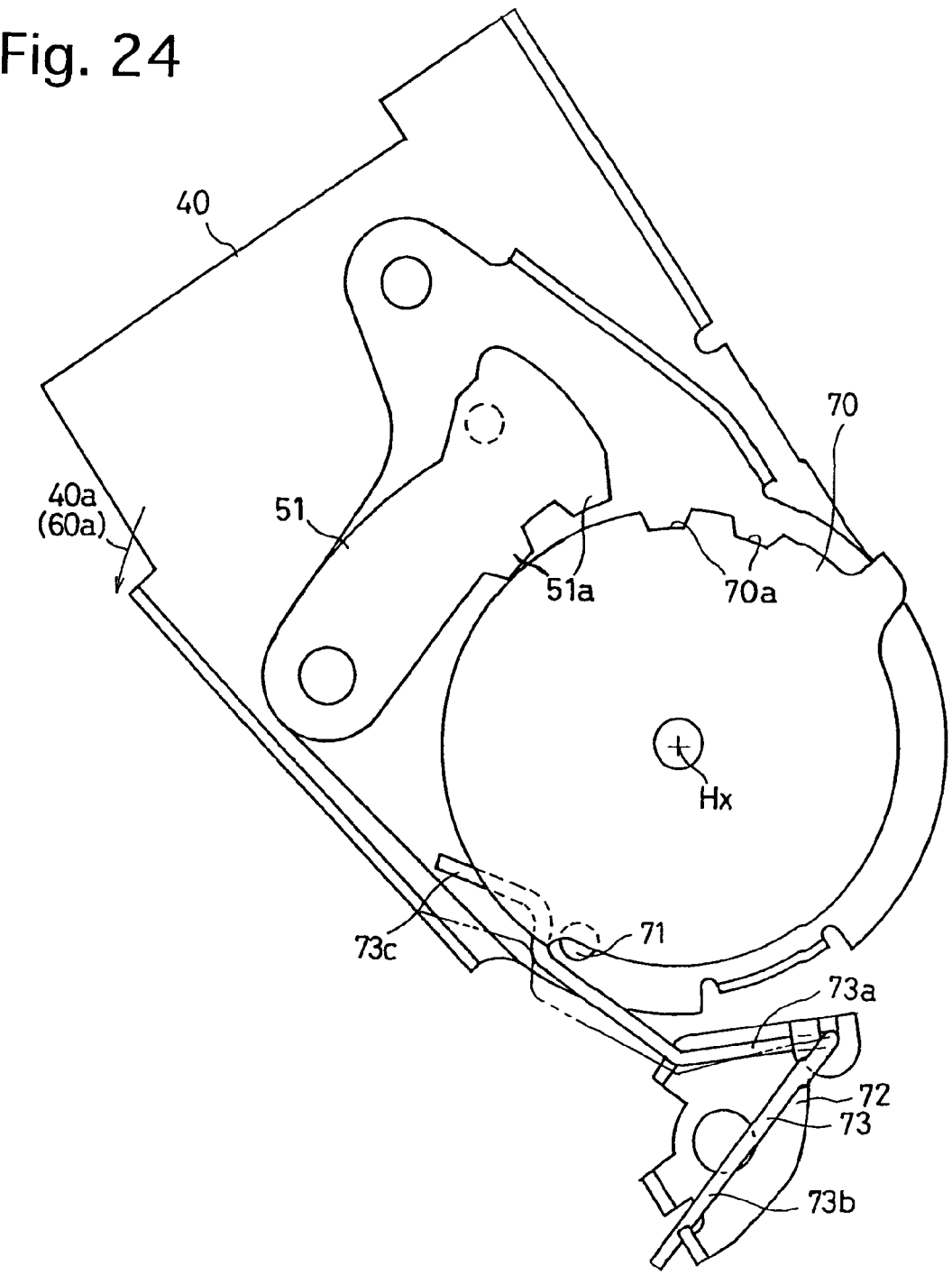
FIG. 24 is a side elevational view of the left upper arm and the associated members which are shown in FIG. 23 in a state where the seat back is in the forward-tilted position.

FIGS. 23 and 24 show a second embodiment of the forward-tilt holding mechanism (that exerts a resistance force on the seat back 13 when the seat back 13 is returned to the upright position from the forward-tilted position in the walk-in state). The second embodiment of the seat mechanism is the same as the first embodiment of the seat mechanism except that the second embodiment of the forward-tilt holding mechanism is different in structure from the first embodiment of the forward-tilt holding mechanism. Parts and elements in the second embodiment of the seat mechanism which are identical to those in the first embodiment of the seat mechanism are designated by the same reference numerals.

A ratchet (engaging member) 70, which corresponds to the ratchet 50, is provided on an outer edge thereof with a pair of memory recesses 70*a*, and is not provided with any other recesses such as the forward-tilt lock recess 50*b* of the ratchet 50. Instead of providing the ratchet 70 with a recess such as the forward-tilt lock recess 50*b*, the left upper arm 40 is provided with an engaging projection (engaging member, stop member) 71 while a forward-tilt holding spring (engaging member, movable engaging member) 73 is supported by a bracket 72 which is fixed to the left upper arm 40. The engaging projection 71 and the forward-tilt holding spring 73 constitute a forward-tilt holding mechanism. The forward-tilt holding spring 73 consists of a long arm portion 73*a* which projects from the bracket 72 to be resiliently deformable, and a short arm portion 73*b* which supports the long arm portion 73*a* when it is resiliently deformed. The long arm portion 73*a* is provided at a free end thereof with an engaging portion 73*c* which is positioned on a rotational moving path of the engaging projection 71. The engaging portion 73*c* has two bends which form a stepped portion. In the state shown in FIG. 23 where the seat back 13 (the left upper arm 40) is in the upright position, the engaging projection 71 is disengaged from the forward-tilt holding spring 73. If the seat back 13 (the left upper arm 40) is pivoted forward as shown in FIG. 24, the engaging projection 71 is engaged with the engaging portion 73*c* with the long arm portion 73*a* being resiliently deformed. The engaging portion 73*c* of the forward-tilt holding spring 73 is shaped to give a spring force for biasing the seat back 13 toward its forward-tilted position, independently of the return springs 40*a* and 60*a*, to a clockwise rotation of the engaging projection 71 about the horizontal axis Hx, i.e., to an operation returning the left upper arm 40 to its upright position. Namely, similar to the forward-tilt lock recess 50*b* and the radially inner memory projection 51*ai*, the forward-tilt holding spring 73 and the engaging projection 71 serve as the second embodiment of the forward-tilt holding mechanism.

Figure 25:
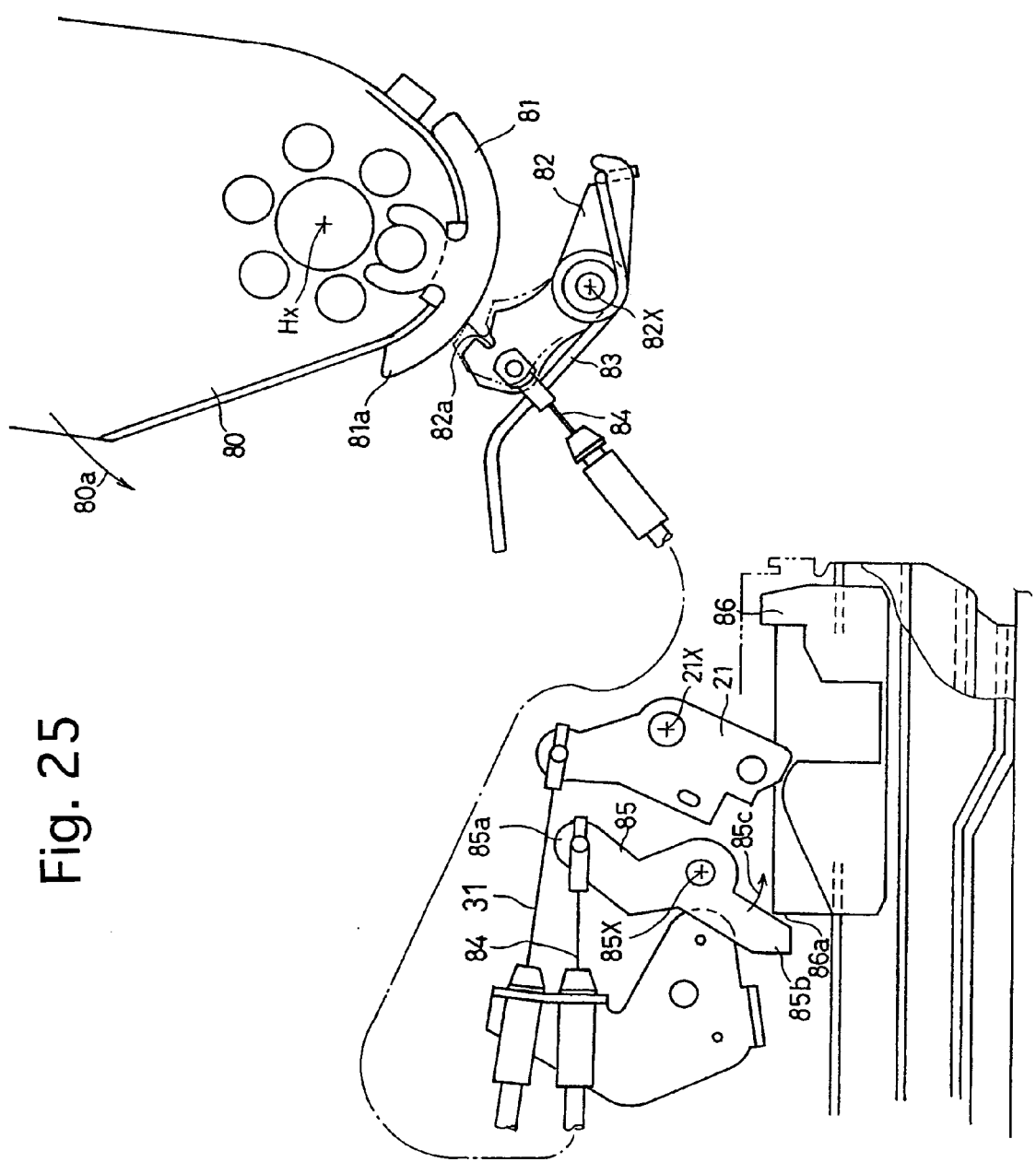
FIG. 25 is a side elevational view of a portion of a third embodiment of the seat mechanism for vehicle according to the first aspect of the present invention, showing a normal seating state of a front sliding seat.
Figure 26:
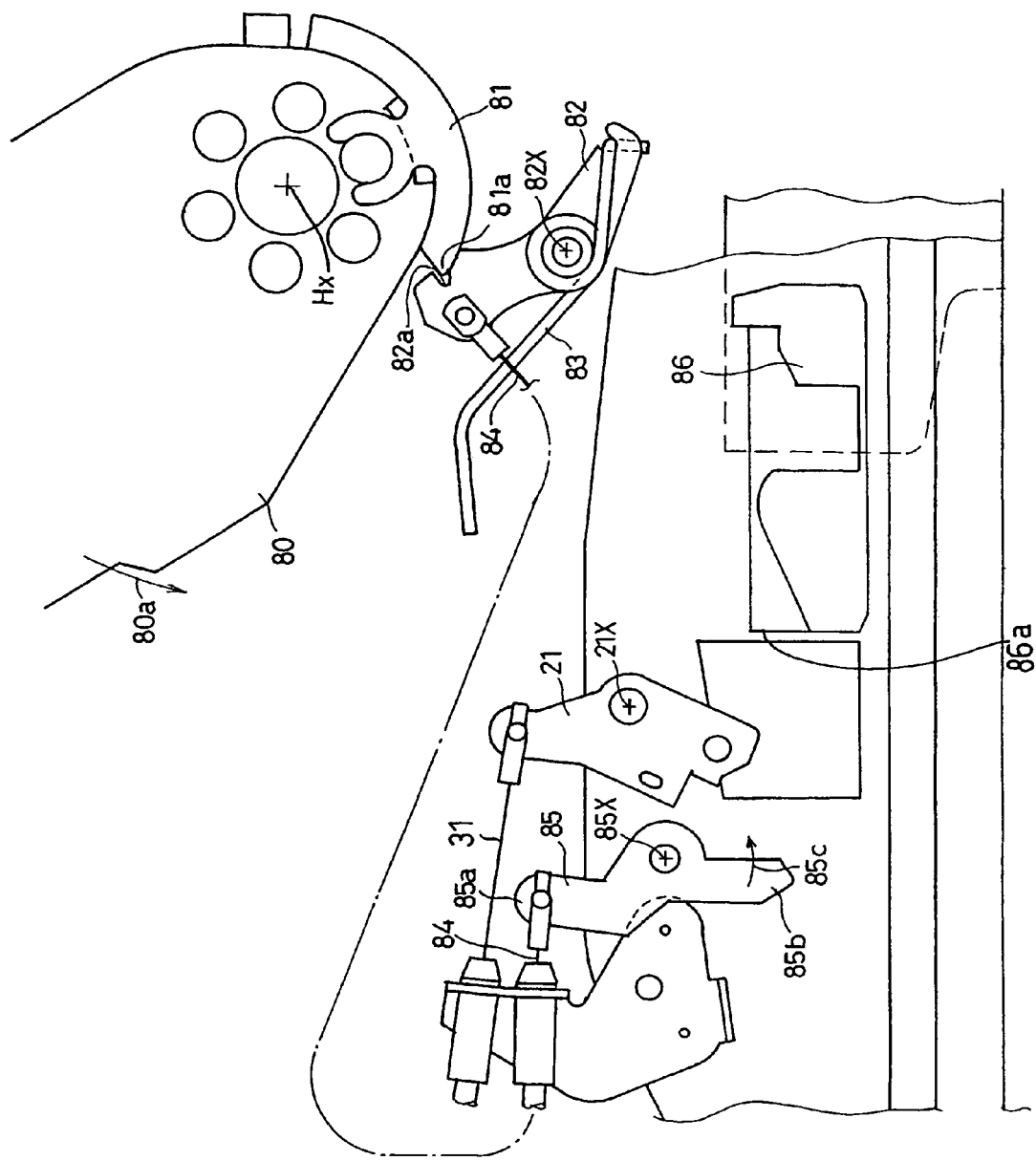
FIG. 26 is a side elevational view of the seat mechanism shown in FIG. 25 in a walk-in state thereof.
Figure 27:
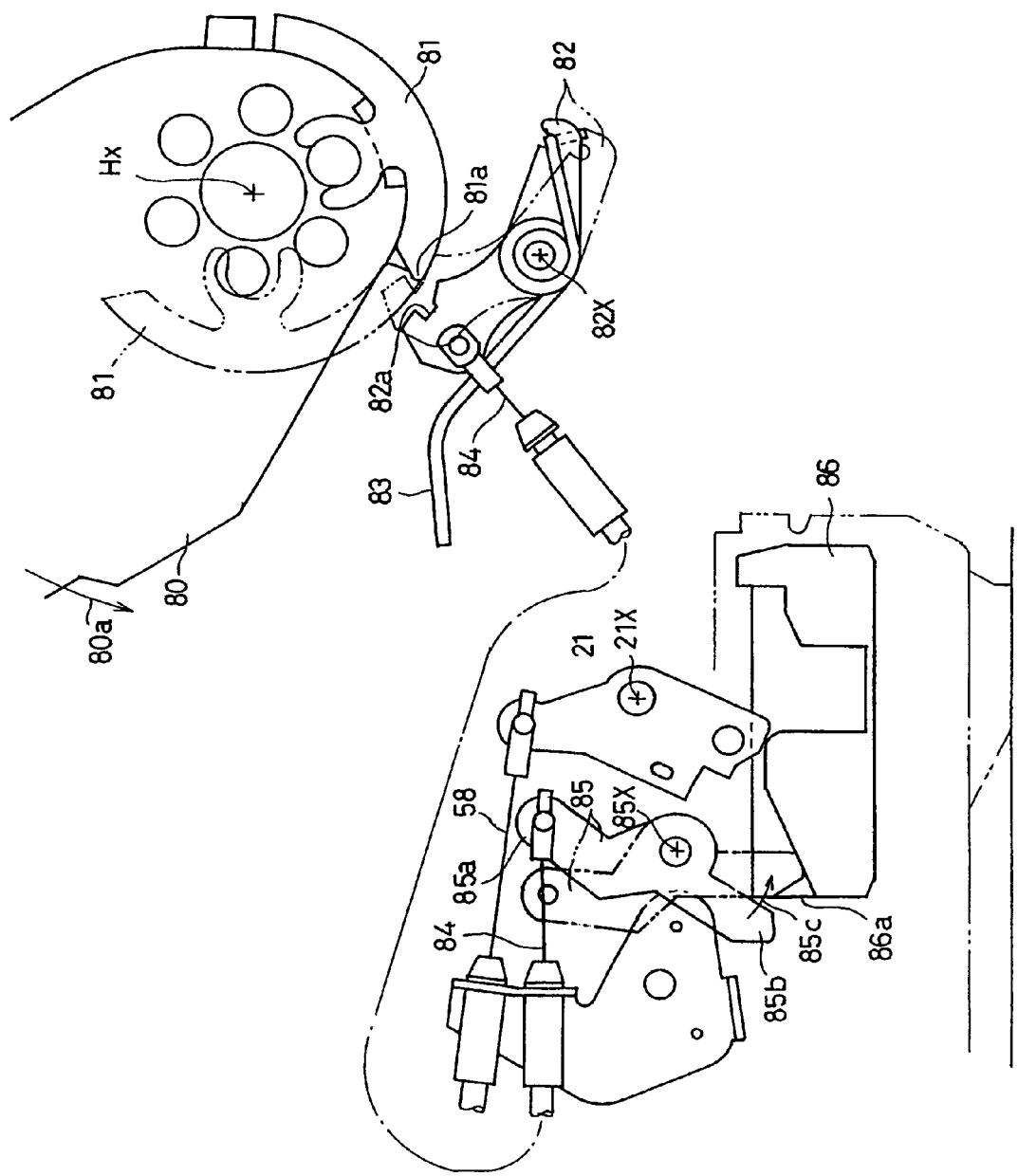
FIG. 27 is a side elevational view of the seat mechanism shown in FIG. 25 in a state where the front sliding seat is returned to a normal seating state after the completion of the walk-in operation.

FIGS. 25 through 27 show a third embodiment of the forward-tilt holding mechanism which is incorporated in a third embodiment of the seat mechanism according to the first aspect of the present invention. The third embodiment of the seat mechanism is the same as the first embodiment of the seat mechanism except that the third embodiment of the forward-tilt holding mechanism is different in structure from the first embodiment of the forward-tilt holding mechanism. Mechanical structures of the third embodiment of the seat mechanism which are not shown in FIGS. 25 through 27 are identical to those of the first embodiment of the forward-tilt holding mechanism. Accordingly, if the seat back 13 (not shown in FIGS. 25 through 27) is pivoted forward, the pull wire 31 pulls the lock open lever 21 to rotate the lock open lever 21 in an unlocking direction (counterclockwise).

The third embodiment of the forward-tilt holding mechanism will be hereinafter discussed. This mechanism is provided with a right upper arm 80 which corresponds to the right upper arm 60 of the first embodiment of the seat mechanism. The right upper arm 80 is provided with a stop plate (engaging member, stop member) 81 that rotates together with the right upper arm 80. A pawl (engaging member, movable engaging member, rotatable member) 82 is positioned in the vicinity of the right upper arm 80, and is pivoted about a rotational pin 82x which is fixed to the right seat cushion frame 14 (not shown in FIGS. 25 through 27) to extend parallel to the horizontal axis Hx. The stop plate 81 and the pawl 82 constitute a forward-tilt holding mechanism. The pawl 82 is provided at one end thereof with a stop recess 82a which can be engaged with a stop edge 81a formed on the stop plate 81. The pawl 82 is biased to rotate clockwise in an engaging direction by a torsion spring 83 to make the stop recess 82a engaged with the stop edge 81a. One end of an association wire cable 84 is engaged with a portion of the pawl 82 in the vicinity of the stop recess 82a, while the other end of the association wire cable 84 is connected to a wire cable engaging arm 85a of a memory plate 85. The memory plate 85 is pivoted about a rotational pin 85x which fixed to the left upper rail 15 to extend parallel to the horizontal axis Hx. The memory plate 85 is provided with an disengaging arm 85b which can be engaged with a releasing edge 86a of a slide member 86. The slide member 86 functions in a similar manner as the slide member 26 in the first embodiment of the seat mechanism. The memory plate 85 is biased to rotate counterclockwise by a spring (biasing member) 85c that is schematically indicated by an arrow in FIGS. 25 through 27. The memory plate 85 and the association wire cable 84 constitute a disengaging device for forcing the pawl 82 to rotate toward the disengaging position when the upper rail 15 is positioned at the adjusted position.

In a normal seating state of the sliding seat 11 shown in FIG. 25 where the stop plate 81 and the pawl 82 are positioned relative to each other, the stop edge 81a and the stop recess 82a cannot be engaged from each other. In addition, the releasing edge 86a of the slide member 86 is engaged with the disengaging arm 85b of the memory plate 85 to press the disengaging arm 85b in a direction to rotate the memory plate 85 clockwise against the spring force of the spring 85c. In this state shown in FIG. 25, if the walk-in operation is performed, firstly the right upper arm 80 (the seat back 13) is pivoted forward (counterclockwise) about the horizontal axis Hx to thereby change the angular position of the stop plate 81 about the horizontal axis Hx, so that the stop edge 81a faces the stop recess 82a (the stop recess 82a is disengaged from the stop edge 81a at this stage). Additionally, the lock open lever 21 rotates by the forward pivoting movement of the seat back 13 to release the slide lock mechanism of the sliding seat 11, while the sliding seat 11 slides forward while leaving the slide member 86 (memory unit). As the sliding seat 11 slides forward, the disengaging arm 85b of the memory plate 85 is disengaged from the releasing edge 86a of the slide member 86 while the memory plate 85 rotates counterclockwise by the spring force of the spring 85c. This counterclockwise rotation of the memory plate 85 loosens the tension in the association wire cable 84, thus causing the pawl 82 to rotate clockwise by the biasing force of the torsion spring 83, so that the stop recess 82a is engaged with the stop edge 81a. Due to this engagement of the stop recess 82a with the stop edge 81a, a resistance force which is different from that produced by two return springs 80a (which correspond to the return springs 40a and 60a) for tilting the seat back 13 forward comes to be applied to the clockwise rotation of the right upper arm 80 for returning the right upper arm 80 to its upright position. In this state, a greater force than usual is required to return the seat back 13 to the upright position.

If the sliding seat 11 is moved rearward to be returned to its normal seating state after the completion of the walk-in operation, the disengaging arm 85b of the memory plate 85 comes into contact with the releasing edge 86a of the slide member 86, and subsequently the memory plate 85 rotates clockwise against the spring force of the spring 85c as shown in FIG. 27. Thereupon, the association wire cable 84 is pulled so that the pawl 82 rotates counterclockwise against the spring force of the torsion spring 83 to disengage the stop recess 82a from the stop edge 81a. This cancels the resistance of the pawl 82 to the operation pivoting the seat back 13 to the upright position, and therefore makes it easy to return the seat back 13 to the upright position.

The third embodiment of the forward-tilt holding mechanism is identical to each of the above described first and second embodiments of the forward-tilt holding mechanisms in that a resistance force to the operation pivoting the seat back 13 to the upright position is caused by the forward-tilt holding mechanism when the seat back 13 is pivoted forward. However, the third embodiment of the forward-tilt holding mechanism is different from each of the above described first and second embodiments of the forward-tilt holding mechanisms in that such a resistance force is automatically canceled immediately after the sliding seat is moved back to the position of its previous adjustment which is remembered by the slide position memory mechanism. This mechanism improves the operability of the sliding seat because the seat back can be manually returned to the upright position from the forward-tilted position by a relatively light force. From a similar point of view, each of the first and second embodiments of the forward-tilt holding mechanisms can be modified so that the aforementioned resistance force is automatically canceled immediately after the sliding seat is moved back to the position of its previous adjustment which is remembered by the slide position memory mechanism. To this end, the first embodiment of the forward-tilt holding mechanism can further be provided with a linkage mechanism which forces the pawl 51 to rotate in a direction to disengage the radially inner memory projections 51ai of the pawl 51 from the forward-tilt lock recess 50b with the use of a rearward movement of the sliding seat 11. In addition, the second embodiment of the forward-tilt holding mechanism can further be provided with a linkage which resiliently deforms the long arm portion 73a of the forward-tilt holding spring 73 in a direction to disengage the engaging projection 71 from the engaging portion 73c with the use of a rearward movement of the sliding seat 11.

Figure 28:
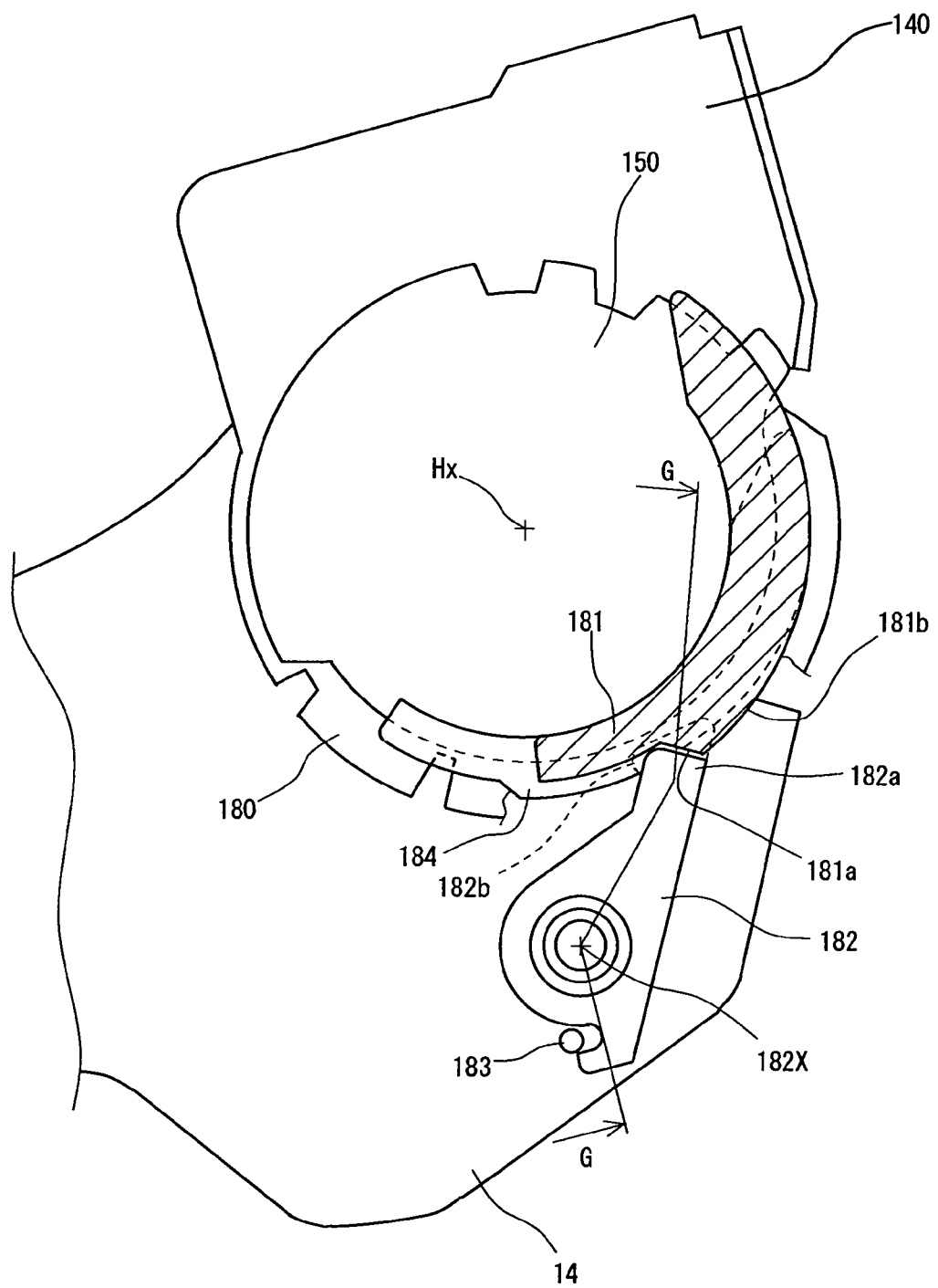
FIG. 28 is a side elevational view of a fourth embodiment of the forward-tilt holding mechanism that is incorporated in the seat mechanism according to the present invention when the seat mechanism is in the walk-in state.
Figure 29:
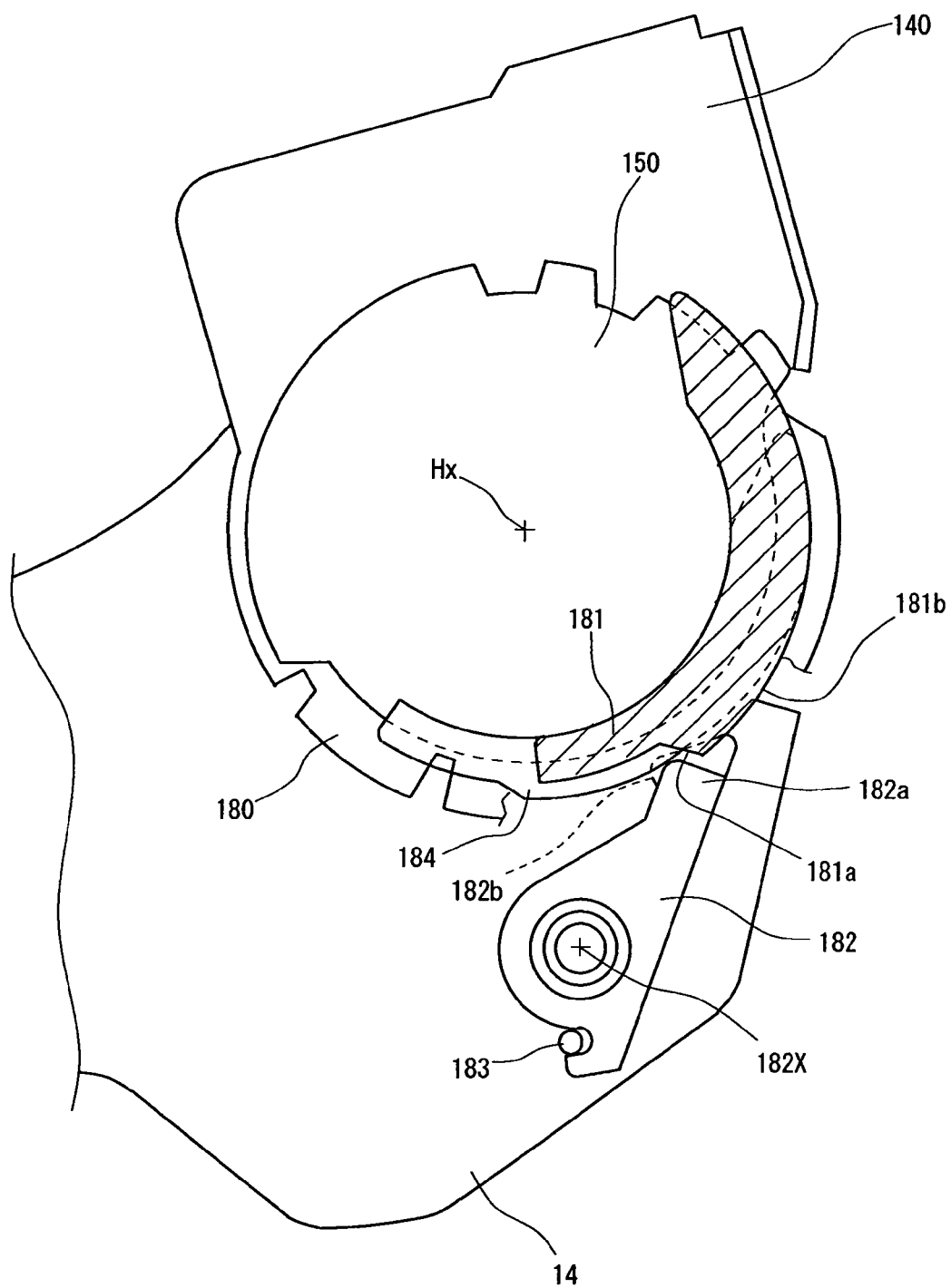
FIG. 29 is a side elevational view of the forward-tilt holding mechanism shown in FIG. 28, showing a state where a pawl for holding the seat back in its forward-tilted position is in a retreated position.
Figure 30:
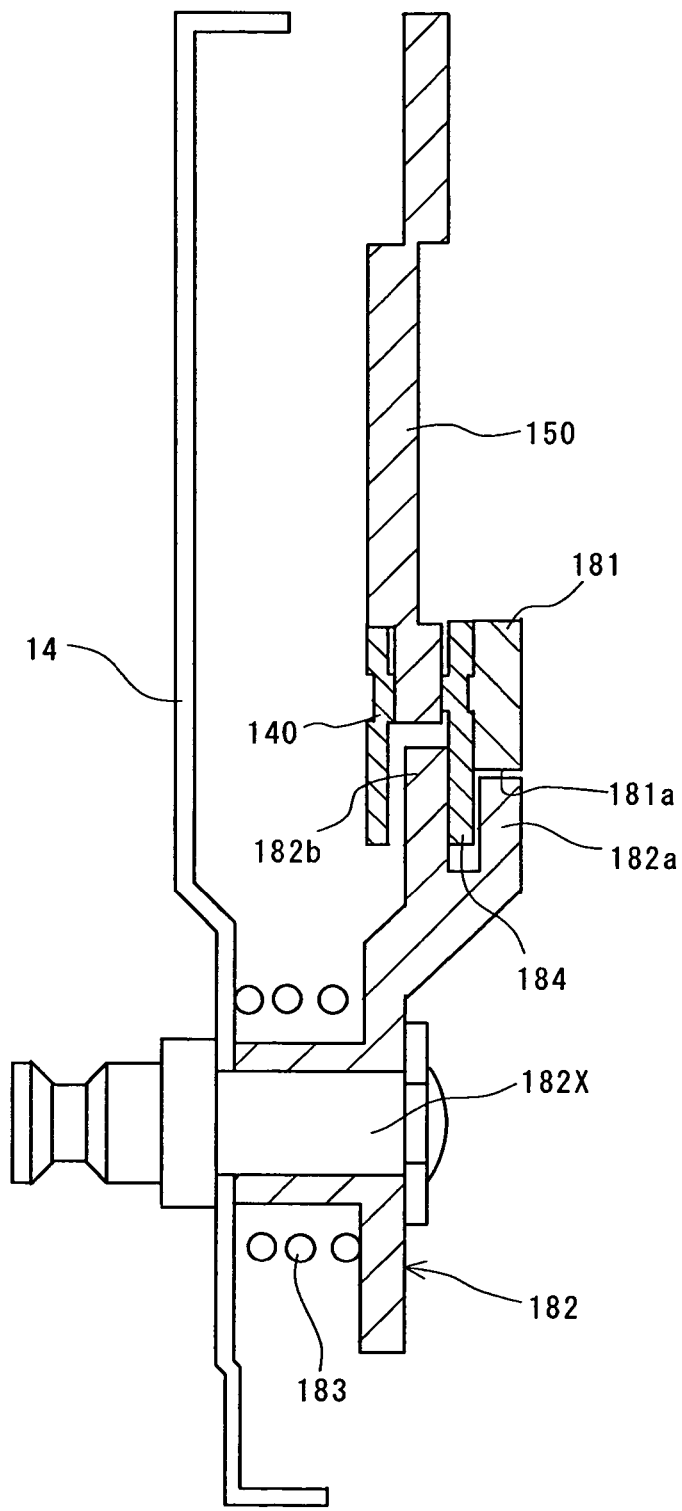
FIG. 30 is a cross sectional view taken along G—G line shown in FIG. 28.
Figure 31:
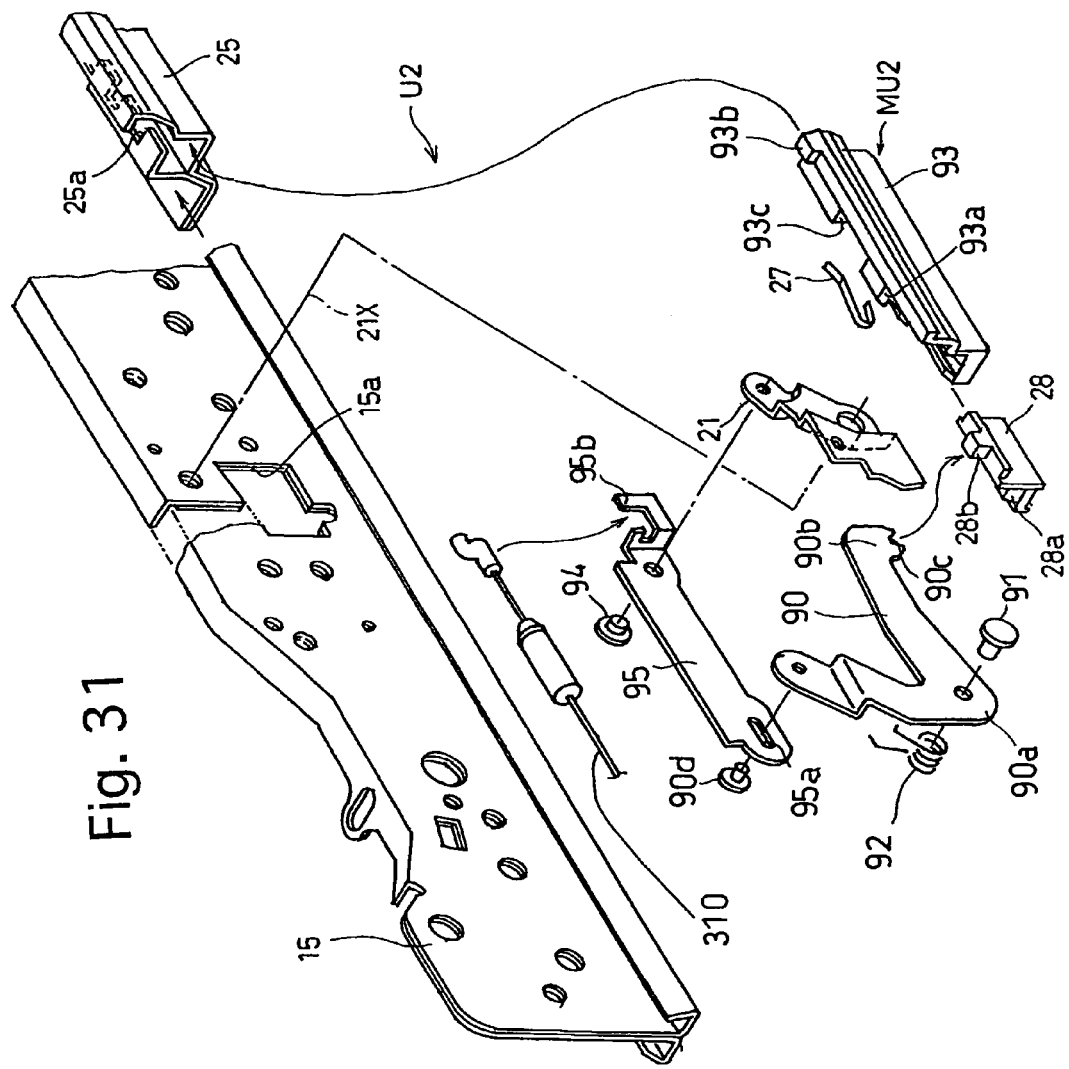
FIG. 31 is an exploded perspective view of an embodiment of a slide position memory mechanism and associated members which are incorporated in a fifth embodiment of the seat mechanism for vehicle according to a second aspect of the present invention.
Figure 32:
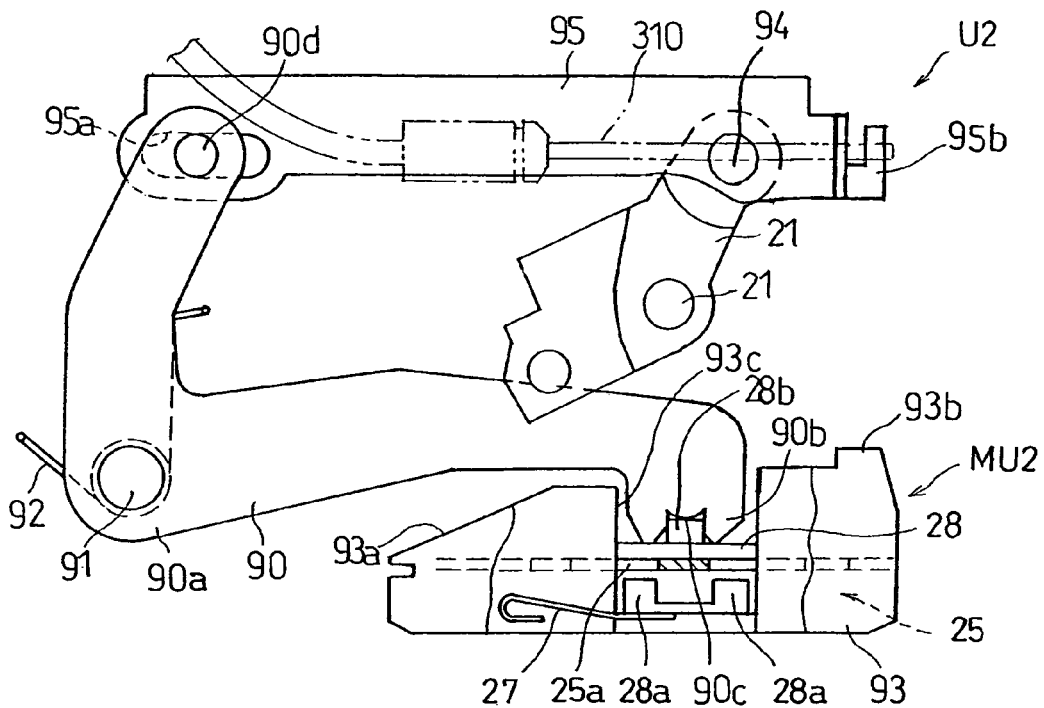
FIG. 32 is a side elevational view of the slide position memory mechanism and the associated members shown in FIG. 31 in a state where the seat back is in the upright position.

FIGS. 28 through 30 show a fourth embodiment of the forward-tilt holding mechanism. The fourth embodiment of the forward-tilt holding mechanism is similar in structure to the third embodiment of the forward-tilt holding mechanism. Specifically, the fourth embodiment of the forward-tilt holding mechanism is designed so that a resistance force is exerted on a pivoting motion of a left upper arm 140 (which corresponds to the left upper arm 40 in the first embodiment of the forward-tilt holding mechanism) toward its upright position from the forward-tilted position by making a pawl (engaging member, movable engaging member, rotatable member) 182 that is pivoted to the left seat cushion frame 14 engaged with a stop plate (engaging member, stop member) 181 (which corresponds to the stop plate 81 in the third embodiment of the forward-tilt holding mechanism) when the walk-in operation is performed. The stop plate 181 and the pawl 182 constitute a forward-tilt holding mechanism. The stop plate 181 is cross-hatched in FIGS. 28 through 29 to be visually distinguished easily from peripheral parts. More specifically, the pawl 182 is pivoted on a rotational pin 182x which is fixed to the left seat cushion frame 14 to extend parallel to the horizontal axis Hx, and a stop portion 182a which is formed on a tip of the pawl 182 that is positioned radially apart from the rotational pin 182x is engageable with an oblique surface (recess) 181a formed on an outer edge of the stop plate 181. One end (lower end as viewed in FIGS. 28 and 29) of a substantially arc-shaped outer edge of the stop plate 181 in a circumferential direction of a ratchet 150 (which corresponds to the ratchet 50 in the first embodiment of the forward-tilt holding mechanism) is recessed radially inwards to form the oblique surface 181a on the outer edge of the stop plate 181. The pawl 182 is biased to rotate in a direction (counterclockwise as viewed in FIGS. 28 and 29) to bring the stop portion 182a into engagement with the oblique surface 181a by the biasing force of a torsion spring (biasing member) 183 (see FIG. 30). With this structure, the stop portion 182a is engaged with the oblique surface 181a by the biasing force of the torsion spring 183 upon the seat back 13 (the left upper arm 140) being pivoted forward from its upright position. This engagement of the stop portion 182a with the oblique surface 181a exerts a resistance force on a pivoting motion of the left upper arm 140 toward its upright position from the forward-tilted position. Respective contacting surfaces of the stop portion 182a and the oblique surfaces 181a which come in sliding contact with each other are formed to have particular shapes (see FIG. 29) so that the pawl 182 rotates in a retreating direction (clockwise as viewed in FIGS. 28 and 29) to disengage the stop portion 182a and the oblique surfaces 181a from each other when the left upper arm 140 is pivoted toward the upright position from the forward-tilt position by a greater force than a predetermined force. Further pivoting the left upper arm 140 toward the upright position in a retreated state of the pawl 182 (i.e., in a state shown in FIG. 29) causes the stop portion 182a of the pawl 182 to ride on a large-diameter outer edge surface 181b of the stop plate 181 which is formed seamlessly with the oblique surface 181a on the substantially arc-shaped outer edge of the stop plate 181 to prevent the stop portion 182a and the oblique surfaces 181a from being engaged with each other.

As shown in FIG. 30, a guide plate 184 is installed between the left upper arm 140 and the stop plate 181, while a tip end of the pawl 182 is bifurcated to have the stop portion 182a and a guide portion 182b which extend parallel to each other to hold the guide plate 184 therebetween. This structure increases the relative positioning accuracy between the left upper arm 140 and the pawl 182 in a widthwise direction of the sliding seat (horizontal direction as viewed in FIG. 30).

Although the fourth embodiment of the forward-tilt holding mechanism is further provided between the left upper arm 140 and the guide plate 184 with the ratchet 150 that serves as an element of the angle memory (which memorizes the reclining angular position of the previous adjustment to the seat back 13 after the seat back 13 has been pivoted forward), the present invention can also be applied to another type of sliding seat which does not have such a reclining memory function. Accordingly, it is possible to omit the ratchet 150.

As can be understood from the descriptions of each of the above embodiments, in the seat mechanism according to the first aspect of the present invention, the possibility that the seat back unintentionally returns to the upright position to thereby lock the slide lock at an unintentional position when one returns the front sliding seat to the upright position from the forward-tilted position while holding the seat back of the front sliding seat by hand after the completion of the walk-in operation is decreased because the seat mechanism is provided, in addition to a biasing device for pivotally biasing the seat back toward its forward-tilted position, with a forward-tilt holding mechanism which provides a resistance to the seat back by the engagement one engaging member with another engaging member when the seat back is pivoted toward the upright position. Namely, the slide position memory mechanism of the slide seat is effectively used. In addition, since the seat back and the slide lock are maintained to be associated with each other, the sliding seat can be surely locked even if one needs to return the seat back to the upright position from the forward-tilted position to be seated in the sliding seat at a position in front of the position of its previous adjustment which is remembered by the slide position memory mechanism.

The seat mechanism according to the present invention is characterized not only in the forward-tilt holding mechanism incorporated in the seat mechanism, but also in the slide position memory mechanism incorporated in the seat mechanism. As can be understood from the above descriptions of the first embodiment of the seat mechanism, the lock releasing operation in which the memory lock lever 28 is disengaged from the memory rack 25 that is fixed to the left lower rail 16 and a sliding-power transfer operation in which a sliding power of the sliding seat 11 is transferred to the memory unit MU1 are performed only via the engaging recess 20a of the catch lever 20. More specifically, the engaging recess 20a of the catch lever 20 has two features; the first feature is to make the engaging recess 20a engaged with the memory lock lever 28 and subsequently to make the engaging recess 20a depress the memory lock lever 28 so that the memory unit MU1 becomes movable freely relative to the memory rack 25 (i.e., so that a memory lock is released), and the second feature is to make the memory unit MU1 follow the movement of the sliding seat 11 by the engagement of the engaging recess 20a with the engaging projection 28b when the sliding seat 11 is moved forward or rearward in a state where the memory unit MU1 can freely move relative to the memory rack 25 by the first feature. In the conventional seat mechanism disclosed in Japanese Unexamined Patent Publication No.8-253064, two features corresponding to the aforementioned first and second features are achieved by two separate portions formed separately on a lock member, which requires the slide position memory mechanism to be made with a high working accuracy. However, such a severe working accuracy is not required for the slide position memory mechanism incorporated in the first embodiment of the seat mechanism. This makes it possible to reduce the production cost of the seat mechanism. Moreover, due to the simple structure of the slide position memory mechanism, both an operation switching the slide position memory mechanism between ON and OFF and an operation moving the memory unit MU1 can be made to be performed surely and smoothly.

FIGS. 31 through 34 show another embodiment (second embodiment) of the slide position memory mechanism which is incorporated in a fifth embodiment of the seat mechanism according to another aspect (second aspect) of the present invention. Parts and elements in the fifth embodiment of the seat mechanism which are identical to those in the first embodiment of the seat mechanism are designated by the same reference numerals, and accordingly, such parts and elements will not be discussed in detail in the following descriptions for the purpose of illustration.

A mechanism (memory position control mechanism), incorporated in the fifth embodiment of the seat mechanism, for moving the memory lock lever 28 (which serves as an element of a slide position memory mechanism U2) between a memory position and a memory release position is different from that incorporated in the first embodiment of the seat mechanism. In addition, the memory position control mechanism is associated with movement of the loop handle 18*b* in the first embodiment of the seat mechanism and is not associated with movement of the seat back 13 in the first embodiment of the seat mechanism, whereas the memory position control mechanism is associated with movement of the seat back 13 and is not associated with movement of the loop handle 18*b*. The point of difference between these two memory position control mechanisms will be hereinafter discussed in detail.

First of all, the memory position control mechanism, incorporated in the fifth embodiment of the seat mechanism, for moving the memory lock lever 28 between the memory position and the memory release position will be discussed hereinafter.

The fifth embodiment of the seat mechanism is provided with a catch lever 90 which corresponds to the catch lever 20 in the first embodiment of the seat mechanism. The catch lever 90 has a substantially V-shape in side elevational view, and is pivoted at its bend 90*a* about a rotational pin 91 fixed to an outer side surface of the left upper rail 15 (not shown in FIGS. 32 through 34). The catch lever 90 is continuously biased to rotate clockwise as viewed in FIGS. 32 through 34 by a torsion spring 92 which is positioned between the catch lever 90 and the left upper rail 15. One free end (rear end) of the catch lever 90 is bifurcated to have an engaging recess 90*c* that is similar to the engaging recess 20*a* of the first embodiment of the seat mechanism. The engaging recess 90*c* can be freely engaged with the engaging projection 28*b* of the memory lock lever 28.

A slide member 93, which corresponds to the slide member 26 and is supported by the memory rack 25 to be slidable thereon in a lengthwise direction of the memory rack 25, is provided on a front portion thereof with an inclined leading surface (leading surface) 93*a*. The slide member 93 is provided at a rear end thereof with a stop projection 93*b* which corresponds to the stop projection 26*b* of the first embodiment of the seat mechanism. The inclined leading surface 93*a* is formed on the slide member 93 to be upwardly inclined in a direction toward the rear of the slide member 93. The slide member 93 is further provided with an accommodation recess 93*c* which is open at an upper end thereof and which can accommodate the memory lock lever 28 in a manner to allow the memory lock lever 28 to move vertically relative to the slide member 93 while preventing the memory lock lever 28 from moving in the forward/rearward direction (horizontal direction as viewed in FIGS. 32 through 34) of the sliding seat 11 relative to the slide member 93. The memory lock lever 28 is movable between the memory position (in which two memory lock projections 28*a* formed on the memory lock lever 28 are engaged in adjacent two of the plurality of memory lock holes 25*a*) and the memory release position (in which the two memory lock projections 28*a* of the memory lock lever 28 are disengaged from the plurality of memory lock holes 25*a*). The memory lock lever 28 is continuously biased toward the memory position by the biasing spring 27.

The catch lever 90 is continuously biased to rotate clockwise by the torsion spring 92 as described above so that the engaging recess 90*c* is normally positioned in an unlock position (the position shown in FIG. 32) in which the engaging recess 90*c* is engaged with the engaging projection 28*b* in the accommodation recess 93*c*. Therefore, in this normal state, the memory lock lever 28 is in the memory release position (the position shown in FIG. 32) in which the two memory lock projections 28*a* of the memory lock lever 28 are disengaged from the plurality of memory lock holes 25*a* against the spring force of the biasing spring 27 (see FIG. 32).

The fifth embodiment of the seat mechanism is provided with a link member 95, the rear end of which is pivoted about a rotational pin 94 fixed to an upper end of the lock open lever 21. The link member 95 extends in substantially the forward/rearward direction of the sliding seat 11. The link member 95 is provided on a front end portion thereof with an elongated hole 95*a* which is elongated in substantially the forward/rearward direction of the sliding seat. An engaging pin 90*d* projects from another free end (different from the above-noted free end that has the engaging recess 90*c*) of the catch lever 90 in a right/left direction of the sliding seat 11 to be engaged in the elongated hole 95*a*. The engaging pin 90*d* is movable in the elongated hole 95*a*. The link member 95 is provided at a rear end thereof with a fixing portion 95*b* to which one end of a pull wire (operation member) 310 is fixed.

The other end of the pull wire 310 is fixed to a left seat back frame (not shown) of the seat back 13. Accordingly, motion (pivoting motion) of the seat back 13 is transferred to the link member 95 since one end and the other end of the pull wire 310 are fixed to the fixing portion 95*b* and the left seat back frame, respectively. On the other hand, the fifth embodiment of the seat mechanism is provided with no stop lever corresponding to the stop lever 22 that the first embodiment of the seat mechanism has. Therefore, motion of the loop handle 18*b* is not transferred to the catch lever 90 in the fifth embodiment of the seat mechanism.

The seat back 13, the memory rack 25, the biasing spring 27, the memory lock lever 28, the pull wire 310, the catch lever 90, the torsion spring 92, the slide member 93, the rotational pin 94 and the link member 95 constitute a slide memory mechanism U2 of the sliding seat 11 in the fifth embodiment of the seat mechanism.

In addition, the biasing spring 27, the memory lock lever 28 and the slide member 93 constitute a memory unit MU2.

The normal seat slide operation and the walk-in operation in the fifth embodiment of the seat mechanism will be discussed hereinafter. The normal seat slide operation is performed by manually operating the loop handle 18*b*, similarly to the normal operation in the first embodiment of the seat mechanism. However, since motion of the loop handle 18*b* is not transferred to the catch lever 90 in the fifth embodiment of the seat mechanism as mentioned above, the memory lock lever 28 remains in the memory release position (the position shown in FIG. 32) even if the loop handle 18*b* is operated. Therefore, if the slide lock mechanism between the pair of upper rails 15 and the pair of lower rails 16 is released by manually operating the loop handle 18*b*, the memory unit MU2 together with the pair of upper rails 15 (the sliding seat 11) becomes slidable on the pair of lower rails 16.

The walk-in operation is performed by manually operating the walk-in lever 30 with no one being seated in the sliding seat 11. Upon the walk-in lever 30 being manually operated, the forward-tilt holding mechanism falls into its unlock state, so that the seat back 13 starts tilting forward by the biasing force of the return springs 40*a* and 60*a* while the pull wire 310 whose tension is loosened is stretched. Consequently, the link member 95 moves forward from the position shown in FIG. 32 to rotate the lock open lever 21 counterclockwise as viewed in FIGS. 32 and 33. This counterclockwise rotation of the lock open lever 21 causes the slide lock member 17 to rotate in the unlocking direction, thus allowing the pair of upper rails 15 (the sliding seat 11) to slide freely on the pair of lower rails 16.

Figure 33:
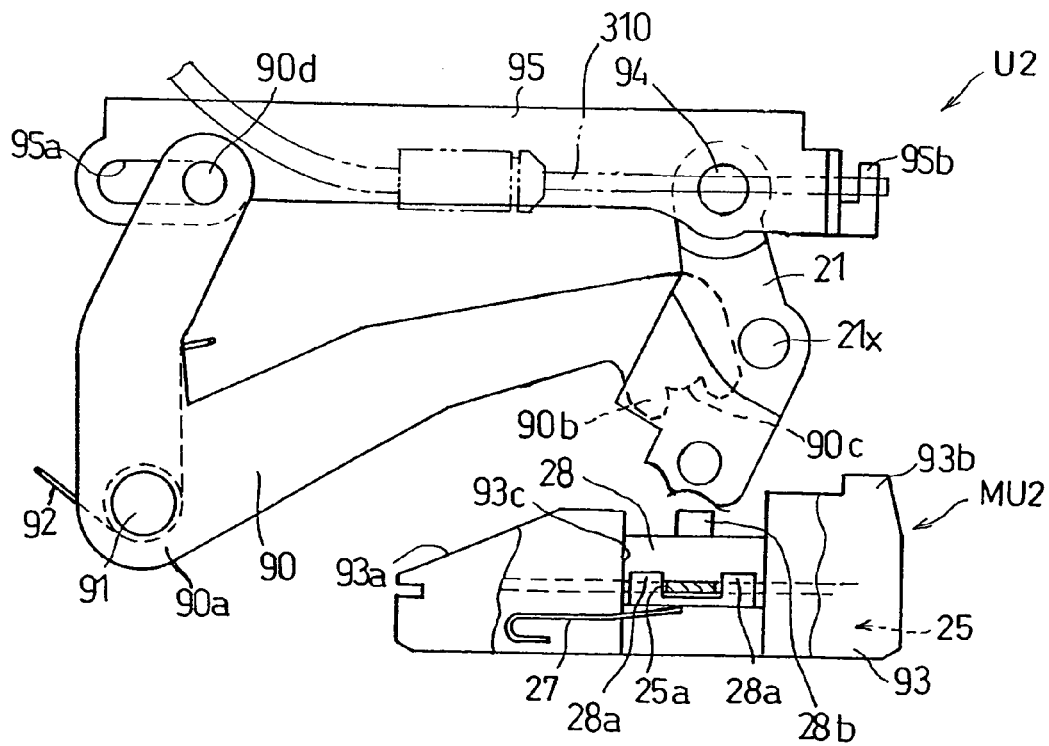
FIG. 33 is a side elevational view of the slide position memory mechanism and the associated members shown in FIG. 31 in a state where the seat back in the forward-tilted position.

Moreover, the forward movement of the link member 95 causes the rear end of the elongated hole 95a to press the engaging pin 90d forward so that the catch lever 90 rotates counterclockwise about the rotational pin 91 against the biasing force of the torsion spring 92 as shown in FIG. 33. This counterclockwise rotation of the catch lever 90 disengages the engaging recess 90c from the engaging projection 28b of the memory lock lever 28, thus causing the memory lock lever 28 to move upward to the memory position, in which two memory lock projections 28a are engaged in adjacent two of the plurality of memory lock holes 25a.

As a result, the sliding seat 11 (the pair of upper rails 15) becomes freely slidable on the pair of lower rails 16. In this state, the memory unit MU2 is in a walk-in state in which the memory unit MU2 becomes unable to move relative to the memory rack 25.

If the sliding seat 11 is moved rearward from the walk-in state, the slide stop 29 (not shown in FIGS. 31 through 34) comes into contact with the stop projection 93b of the slide member 93 to thereby prevent the sliding seat 11 from further moving rearward. Since the slide member 93 has not moved from the beginning of the walk-in operation, this position (rearward movement prevention position) of the slide member 26 corresponds to that position of the previous adjustment to the sliding seat 11 which is remembered by the slide position memory mechanism. If the seat back 13 is returned to the upright position from the forward-tilted position, the slide lock member 17 returns to the locked position, in which the upper rails 15 are prevented from moving relative to the pair of lower rails 16.

When sliding the sliding seat 11 rearward from the walk-in state, one may stop moving the sliding seat 11 intentionally or unintentionally before the slide stop 29 comes into contact with the stop projection 93b of the slide member 93, and subsequently may return the seat back 13 to the upright position at this position of the sliding seat 11 to lock the pair of upper rails 15 of the sliding seat 11.

Figure 34:
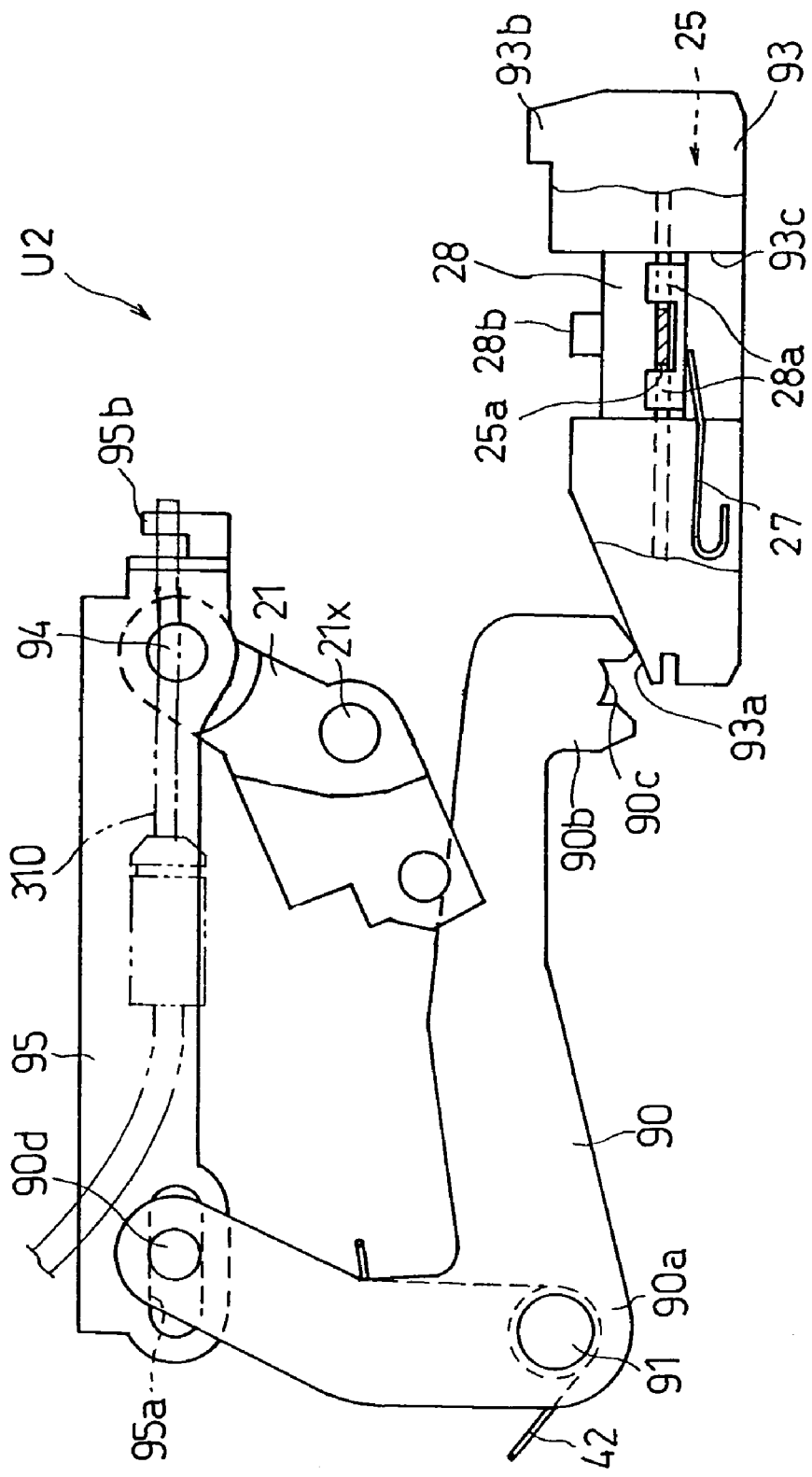
FIG. 34 is a side elevational view of the slide position memory mechanism and the associated members shown in FIG. 31 in a state where a rear end portion of a catch lever comes into contact with an inclined leading surface in the middle of rearward movement of the sliding seat when the sliding seat is moved rearward to the position (memory position) of its previous adjustment which is remembered by the slide position memory mechanism after the sliding seat is temporarily locked before the sliding seat reaches to the memory position following the sliding seat being moved rearward after the completion of the walk-in operation.

In such a case, if the slide lock member 17 is unlocked by a normal sliding movement of the sliding seat 11 to make the sliding seat 11 move reward to a point at which the slide stop 29 comes into contact with the stop projection 93b of the slide member 93, a rear end portion 90b of the catch lever 90 in the vicinity of the engaging recess 90c comes into contact with the inclined leading surface 93a in the middle of rearward movement of the sliding seat 11 before the slide stop 29 comes into contact with the stop projection 93b as shown in FIG. 34. Since the catch lever 90 is continuously biased to rotate clockwise by the biasing force of the torsion spring 92, the rear end portion 90b of the catch lever 90 firstly rides across the inclined leading surface 93a, subsequently moves rearward while sliding on a top surface of the slide member 93, and thereafter drops into the accommodation recess 93c of the slide member 93. Consequently, the catch lever 90 automatically returns to the unlock position shown in FIG. 32. Accordingly, the inclined leading surface 93a has a function of temporarily lifting the rear end portion 90b of the catch lever 90 so that the engaging recess 90c can be re-engaged with the engaging projection 28b of the memory lock lever 28.

As can be understood from the above descriptions, in the fifth embodiment of the seat mechanism, since the lock releasing operation in which the memory lock lever 28 is disengaged from the memory rack 25 that is fixed to the left lower rail 16 and a sliding-power transfer operation in which a sliding power of the sliding seat 11 is transferred to the memory unit MU2 are performed only via the engaging recess 90c of the catch lever 90, these two operations (the lock releasing operation and the sliding-power transfer operation) are performed surely and smoothly, similar to the first embodiment of the seat mechanism. Moreover, the working accuracy formerly required for the working of the catch lever 90 does not have to be so high as before.

Furthermore, the catch lever 90 singly moves the memory lock lever 28 (which serves an element for achieving a feature that remembers an adjusted position of the sliding seat 11 after it has been moved forward relative to the pair of lower rails 16) between the memory position and the memory release position, and also moves the memory lock lever 28 in the forward/rearward direction of the sliding seat 11. Hence, the slide position memory mechanism is simple in structure, so that the cost of production can be reduced.

Unlike the first embodiment of the seat mechanism, in the fifth embodiment of the seat mechanism, the slide position memory mechanism is constructed so that the catch lever 90 and the memory lock lever 28 are disengaged from each other by a forward pivoting motion of the seat back 13, not by an operating force produced by operation of the loop handle 18b, with the catch lever 90 having been biased in a direction to press the memory lock lever 28. Due to this structure, when the sliding seat 11 is moved rearward from the walk-in state, the catch lever 90 can be returned to the unlock position automatically and smoothly if the sliding seat 11 is temporarily stopped moving rearward to lock the pair of upper rails 15 relative to the pair of lower rails 16 before the slide stop 29 comes into contact with the stop projection 93b and thereafter if the sliding seat 11 is moved rearward by a normal sliding movement of the sliding seat 11 to a point at which the slide stop 29 comes into contact with the stop projection 93b of the slide member 93.

Although the present invention has been described above with reference to more than one embodiment of the seat mechanism, obvious changes may be made in the specific embodiments of the present invention described herein, such modifications being within the spirit and scope of the invention claimed. It is indicated that all matter contained herein is illustrative and does not limit the scope of the present invention.

For instance, although the sliding seat in the first embodiment of the seat mechanism is provided with a reclining angle adjusting mechanism having the function of remembering the angular position of the previous adjustment to the seat back 13 after the seat back 13 has been pivoted forward, the present invention can also be applied to another type of sliding seat which does not have such a memory function. Moreover, the present invention can also be applied to a non-reclining type of sliding seat as long as the seat back thereof can be pivoted between forward-tilted position and upright position.

Although each of the slide lock mechanism and the slide-position memory mechanism is structured so that the sliding seat is locked by the engagement of an engaging projection with an engaging recess in each of the above described embodiments of the seat mechanisms, the engaging projection and the engaging recess can be replaced by the engaging recess and the engaging projection, respectively. Namely, a plurality of nail portions corresponding to the bifurcated nail portion 17a of the slide lock member 17 can be formed on each lower rail 16 along the longitudinal direction thereof while one slide lock hole (corresponding to one slide lock hole 16a of each lower rail 16) which can be selectively engaged with the aforementioned plurality of nail portions formed on the each lower rail 16 can be formed on the slide lock member 17, and/or an engaging projection corresponding to the engaging projection 28*b* of the memory lock lever 28 can be formed on a rear end of the catch lever 20 or 90 while an engaging recess (corresponding to the engaging recess 20*a* of the catch lever 20) which can be engaged with the aforementioned engaging projection formed on the catch lever 20 or 90 can be formed on a top end of the memory lock lever 28.

Moreover, each of the first through fifth embodiments of the seat mechanisms can be modified in a manner so that the memory rack 25 is omitted, so that a gutter-like groove in which the memory member 26 or 93 can be accommodated is formed on a portion of the left lower rail 16, and so that a plurality of holes corresponding to the plurality of memory lock holes 25*a* of the memory rack 25 are formed in the gutter-like groove. Furthermore, a projection corresponding to the memory lock projection 28*a* of the memory lock lever 28 can be formed on the memory rack 25 (or in the aforementioned gutter-like groove of the left lower rail 16 in the case where the memory rack 25 is omitted) while a recess corresponding to the memory lock recess 25*a* of the memory rack 25 can be formed on the memory lock lever 28.

What is claimed is:

1. A seat mechanism for a vehicle, comprising:
   a lower rail fixable to a vehicle floor;
   an upper member having an upper rail which is guided by said lower rail to be freely slidable thereon;
   a seat back which is pivoted on said upper member, said seat back being movable between an upright position and a forward-tilted position;
   a holding device for holding said seat back in said upright position;
   a slide lock mechanism for locking said upper member relative to said lower rail when said seat back is in said upright position, and for unlocking said upper rail relative to said lower rail when said seat back is in said forward-tilted position;
   a slide-position memory mechanism for remembering an adjusted position of said upper rail relative to said lower rail after said seat back has been pivoted forward to said forward-tilted position so that said upper rail is prevented from moving rearward beyond said adjusted position when said seat back is at said forward tilted position; and
   a forward-tilt holding mechanism for holding said seat back in said forward-tilted position:
   wherein said forward-tilt holding mechanism includes at least two engaging members which are engaged with each other when said seat back is in said forward-tilted position, and which are disengaged from each other when said seat back is in said upright position, said forward-tilt holding mechanism providing a resistance force in said engagement of one of said two engaging members with the other of said two engaging members during a returning operation of said seat back to said upright position from said forward-tilted position;
   wherein said engaging members of said forward-tilt holding mechanism are independent of said holding device and comprise:
      a fixed engaging member mounted to said seat back and
      a movable engaging member mounted to said upper member;
   wherein said movable engaging member is engaged with said fixed engaging member when said seat back is tilted forward; and
   wherein said movable engaging member is movable in a direction to be disengaged from said fixed engaging member.

2. The seat mechanism for vehicle according to claim 1, wherein said forward-tilt holding mechanism comprises:
   a ratchet which is supported by said seat back to be rotatable about a rotational axis of said seat back;
   at least one recess formed on an outer edge of said ratchet;
   a pawl which is supported by said seat back to be movable relative to said seat back between an engaging position, in which said pawl is engaged with said recess, and a disengaging position, in which said pawl is disengaged from said recess, when said seat back is tilted forward; and
   a biasing member for biasing said pawl in a direction toward said engaging position.

3. The seat mechanism for vehicle according to claim 2, wherein a plurality of recesses are formed on said outer edge of said ratchet; and
   wherein said pawl is selectively engaged in one of said plurality of recesses and the other of said plurality of recesses when said seat back is in said forward-tilted position and said upright position, respectively.

4. The seat mechanism for vehicle according to claim 1, wherein said movable engaging member, which is mounted to said upper rail, comprises a holding spring which is resiliently deformable between a first state, in which said holding spring holds said fixed engaging member, and a second state, in which said holding spring releases said fixed engaging member.

5. The seat mechanism for vehicle according to claim 1, wherein said movable engaging member, which is mounted to said seat cushion, comprises a rotatable member which is rotatable between an engaging position in which said rotatable member is engaged with said fixed engaging member and a disengaging position in which said rotatable member is disengaged from said fixed engaging member,
   said seat mechanism further comprising a biasing member for biasing said rotatable member toward said engaging position thereof.

6. The seat mechanism for vehicle according to claim 5, wherein said rotatable member comprises a pawl having bifurcated portions at end portion of said pawl so that at least one of the bifurcated portions comes into contact with a guide plate integral with said fixed engaging member to increase the positioning accuracy between said pawl and said fixed engaging member in a widthwise direction of the seat.

7. The seat mechanism for vehicle according to claim 5, further comprising a disengaging device for forcing said rotatable member to rotate toward said disengaging position when said upper rail is positioned in said adjusted position.

8. The seat mechanism for vehicle according to claim 1, further comprising:
   a forward-tilt biasing device for biasing said seat back toward said forward-tilted position; and wherein the holding device for holding said seat back in said upright position is capable of holding against the biasing force of said forward-tilt biasing device, wherein a magnitude of resistance force of said holding device is greater than a magnitude of resistance force in said forward-tilt biasing device.

9. A seat mechanism for a vehicle, comprising:
   a lower rail fixable to a vehicle floor;
   an upper member having an upper rail which is guided by said lower rail to be freely slidable thereon;

a seat back which is pivoted on said upper member, said seat back being movable between an upright position and a forward-tilted position; and a slide-position memory mechanism for remembering an adjusted position of said upper rail relative to said lower rail after said seat back has been pivoted forward to said forward-tilted position so that said upper rail is prevented from moving rearward beyond said adjusted position when said seat back is at said forward tilted position, wherein said slide-position memory mechanism comprises:

a memory lock member movable between a memory position in which said memory lock member is immovable relative to said lower rail and a memory release position in which said memory lock member is movable along said lower rail, said memory lock member including one of an engaging projection and an engaging recess which are engageable with each other;

a biasing member for biasing said memory lock member in a direction to said memory position;

a catch lever which is mounted to said upper rail and includes the other of said engaging projection and said engaging recess, said catch lever being movable between an unlocked position, in which said catch lever moves said memory lock member to said memory release position against said biasing member with said engaging projection and said engaging recess remaining engaged with each other, and a locked position, in which said catch lever allows said memory lock member to return to said memory position; and an operating device for moving said catch lever between said locked position and said unlocked position.

10. The seat mechanism for vehicle according to claim 9, wherein a plurality of memory lock holes are formed on one of said lower rail and a fixed member which is fixed to said lower rail to be aligned in a longitudinal direction of said one of said lower rail and said fixed member, wherein at least one memory lock projection, which is selectively engageable with said plurality of memory lock holes, is formed on the other of said lower rail and said fixed member, and wherein said memory lock member is held in said memory position by engagement of said memory lock projection with at least one of said plurality of memory lock holes.

11. The seat mechanism for vehicle according to claim 9, wherein a plurality of memory lock projections are formed on one of said lower rail and a fixed member fixed to said lower rail to be aligned in a longitudinal direction of said one of said lower rail and said fixed member, wherein at least one memory lock hole, which is selectively engageable with said plurality of memory lock projections, is formed on the other of said lower rail and said fixed member, and wherein said memory lock member is held in said memory position by engagement of said memory lock hole with at least one of said plurality of memory lock projections.

12. The seat mechanism for vehicle according to claim 9, wherein said slide-position memory mechanism comprises a slide stop which is immovable relative to said upper rail when said memory lock member is in said memory position, and wherein said upper rail includes a stop projection which comes into contact with said slide stop to prevent said sliding seat from moving rearward beyond a point of said contact between said stop projection and said slide stop when said memory lock member is in said memory position.

13. The seat mechanism for vehicle according to claim 9, further comprising a slide lock mechanism which is changeable between a locking state, in which said slide lock mechanism locks said upper rail relative to said lower rail, and an unlocking state, in which said slide lock mechanism unlocks said upper rail relative to said lower rail, wherein said operating device comprises an operating handle which is manually operated to change said slide lock mechanism between said locking state and said unlocking state, wherein said operating handle moves said catch lever to said locked position when said slide lock mechanism is in said locking state, and wherein said operating handle moves said catch lever to said unlocked position when said slide lock mechanism is in said unlocking state.

14. The seat mechanism for vehicle according to claim 9, wherein said operating device comprises a pull wire for transmitting motion of said seat back to said catch lever, wherein said pull wire moves said catch lever to said unlocked position when said seat back is in said upright position, and wherein said pull wire moves said catch lever to said locked position when seat back tilts forward to said forward-tilted position.

15. The seat mechanism for vehicle according to claim 14, wherein said catch lever is pivoted on said upper member to be rotatable forward and reverse in accordance with an operation of said pull wire, and is continuously biased to rotate toward said unlocked position, wherein said slide-position memory mechanism includes a slide member which moves together with said memory lock member in a longitudinal direction of said lower rail, and wherein said slide member comprises: an accommodation recess for accommodating said memory lock member; and a leading surface for leading one of said engaging recess and said engaging projection of said catch lever to said accommodation recess while making said catch lever rotate toward said locked position when said catch lever which is positioned in front of said slide member moves rearward while sliding on said leading surface.

16. A seat mechanism for a vehicle according to claim 9, further comprising:

a slide lock mechanism for locking said upper member relative to said lower rail when said seat back is in said upright position, and for unlocking said upper rail relative to said lower rail when said seat back is in said forward-tilted position; and a forward-tilt holding mechanism for holding said seat back in said forward-tilted position;

wherein said forward-tilt holding mechanism includes at least two engaging members which are engaged with each other when said seat back is in said forward-tilted position, and which are disengaged from each other when said seat back is in said upright position, said forward-tilt holding mechanism providing a resistance force in said engagement of one of said two engaging members with the other of said two engaging members during a returning operation of said seat back to said upright position from said forward-tilted position.

17. A seat mechanism for a vehicle according to claim 16, wherein said engaging members of said forward-tilt holding mechanism are independent of the holding device and comprise:
- a fixed engaging member mounted to said seat back and a movable engaging member mounted to said upper member;
- wherein said movable engaging member is engaged with said fixed engaging member when said seat back is tilted forward; and
- wherein said movable engaging member is movable in a direction to be disengaged from said fixed engaging member.

18. The seat mechanism for vehicle according to claim 17, wherein said movable engaging member, which is mounted to said seat cushion, comprises a rotatable member which is rotatable between an engaging position in which said rotatable member is engaged with said fixed engaging member and a disengaging position in which said rotatable member is disengaged from said fixed engaging member,
- said seat mechanism further comprising a biasing member for biasing said rotatable member toward said engaging position thereof.

* * * * *